United States Patent
Qian et al.

(10) Patent No.: US 11,224,068 B2
(45) Date of Patent: Jan. 11, 2022

(54) METHOD AND APPARATUS FOR CONTENTION-FREE RANDOM ACCESS AND UPLINK POWER CONTROL IN WIRELESS COMMUNICATION SYSTEM

(71) Applicant: Samsung Electronics Co., Ltd, Suwon-si (KR)

(72) Inventors: Chen Qian, Beijing (CN); Bin Yu, Beijing (CN); Qi Xiong, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 100 days.

(21) Appl. No.: 16/497,428

(22) PCT Filed: Mar. 26, 2018

(86) PCT No.: PCT/KR2018/003546
§ 371 (c)(1),
(2) Date: Sep. 24, 2019

(87) PCT Pub. No.: WO2018/174687
PCT Pub. Date: Sep. 27, 2018

(65) Prior Publication Data
US 2020/0037360 A1    Jan. 30, 2020

(30) Foreign Application Priority Data

Mar. 24, 2017 (CN) .......................... 201710182283.X
Mar. 24, 2017 (CN) .......................... 201710182844.6
Jan. 11, 2018 (CN) .......................... 201810027589.2

(51) Int. Cl.
H04W 4/00     (2018.01)
H04W 74/08    (2009.01)
(Continued)

(52) U.S. Cl.
CPC ....... *H04W 74/0808* (2013.01); *H04L 1/0061* (2013.01); *H04W 8/24* (2013.01); *H04W 16/28* (2013.01); *H04W 84/042* (2013.01)

(58) Field of Classification Search
CPC . H04W 52/16; H04W 52/146; H04W 52/246; H04W 52/367
See application file for complete search history.

(56) References Cited

U.S. PATENT DOCUMENTS

2011/0003567 A1* 1/2011 Lee ...................... H04W 52/16
                                                                        455/127.1
2013/0329662 A1   12/2013 Chen et al.
(Continued)

FOREIGN PATENT DOCUMENTS

| CN | 103458528 A | 12/2013 |
|---|---|---|
| CN | 103634915 A | 3/2014 |
| EP | 2890203 B1 | 1/2018 |

OTHER PUBLICATIONS

Intel Corporation, "4-step Random Access Procedure", 3GPP TSG RAN WG1 Meeting RAN1 #88, Feb. 13-17, 2017, R1-1702185, 5 pages.
(Continued)

*Primary Examiner* — Bo Hui A Zhu

(57) ABSTRACT

The present disclosure relates to a pre-5th-Generation (5G) or 5G communication system to be provided for supporting higher data rates beyond 4th-Generation (4G) communication system such as long term evolution (LTE). The method in a wireless communication system is provided. The method includes transmitting a message including an indication of a beam reciprocity capability of the terminal if a random access response is detected in the random access; and detecting a contention resolution information to complete the random access.

7 Claims, 20 Drawing Sheets

(51) Int. Cl.
  *H04L 1/00* (2006.01)
  *H04W 8/24* (2009.01)
  *H04W 16/28* (2009.01)
  *H04W 84/04* (2009.01)

(56) References Cited

U.S. PATENT DOCUMENTS

| | | | |
|---|---|---|---|
| 2014/0362794 | A1 | 12/2014 | Zhao et al. |
| 2015/0016312 | A1 | 1/2015 | Li et al. |
| 2015/0305014 | A1 | 10/2015 | Li et al. |
| 2015/0305661 | A1 | 10/2015 | Seassau |
| 2016/0227582 | A1 | 8/2016 | Vajapeyam et al. |
| 2018/0063839 | A1* | 3/2018 | Jung ............... H04W 72/0446 |

OTHER PUBLICATIONS

Nokia et al., "Beam Measurements and TX/RX Beam Correspondence", 3GPP TSG RAN WG1#88, Feb. 13-17, 2017, R1-1703161, 3 pages.
Vivo, "Discussion on beam management for NR MIMO", 3GPP TSG RAN WG1 AH-NR Meeting, Jan. 16-20, 2017, R1-1700274, 7 pages.
Nokia Networks et al., "Impact of the TBS restriction of Cat-0 UE", 3GPP TSG-RAN WG2 Meeting #87bis, Oct. 6-10, 2014, R2-144207, 3 pages.
Nokia Corporation et al., RACH partitioning, 3GPP TSG-RAN WG2 Meeting #63, Aug. 18-22, 2008, R2-084275, 4 pages.
Supplementary Partial European Search Report dated Feb. 19, 2020 in connection with European Patent Application No. 18 77 2696, 14 pages.
"3rd Generation Partnership Project; Technical Specification Group Radio Access Network; Study on New Radio Access Technology; Radio Interface Protocol Aspects (Release 14)", 3GPP TR 38.804 V1.0.0 (Mar. 2017), 56 pages.
International Telecommunication Union, "IMT Traffic estimates beyond year 2020", Document 5D/TEMP/466-E, Oct. 21, 2014, 35 pages.
International Telecommunication Union, "Future technology trends of terrestrial IMT systems", Report ITU-R M.2320-0, (Nov. 2014), 32 pages.
International Telecommunication Union, "IMT Vision—Framework and overall objectives of the future development of IMT for 2020 and beyond", Recommendation ITU-R M.2083-0, (Sep. 2015), 21 pages.
Cheol Jeong et al., "Random Access in Millimeter-Wave Beamforming Cellular Networks: Issues and Approaches", Millimeter-Wave Communications for 5G, IEEE Communication Magazine, Jan. 2015, p. 180-185.
International Search Report dated Aug. 9, 2018 in connection with International Patent Application No. PCT/KR2018/003546, 4 pages.
Written Opinion of the International Searching Authority dated Aug. 9, 2018 in connection with International Patent Application No. PCT/KR2018/003546, 7 pages.
Supplementary European Search Report in connection with European Application No. 18772696.3 dated Apr. 17, 2020, 15 pages.
Samsung, "Random Access Procedure in NR", 3GPP TSG-RAN WG2 #96, Nov. 14-18, 2016, R2-167568, 7 pages.
Ericsson, "Random Access in NR", 3GPP TSG-RAN WG2 #98-AH, Tdoc R2-1707126, 5 pages.
European Search Report dated Oct. 12, 2021 in connection with European Patent Application No. 21 19 3469, 10 pages.
Office Action dated Jul. 15, 2021 in connection with Chinese Patent Application No. 201810027589.2, 15 pages.

\* cited by examiner

[Fig. 1]
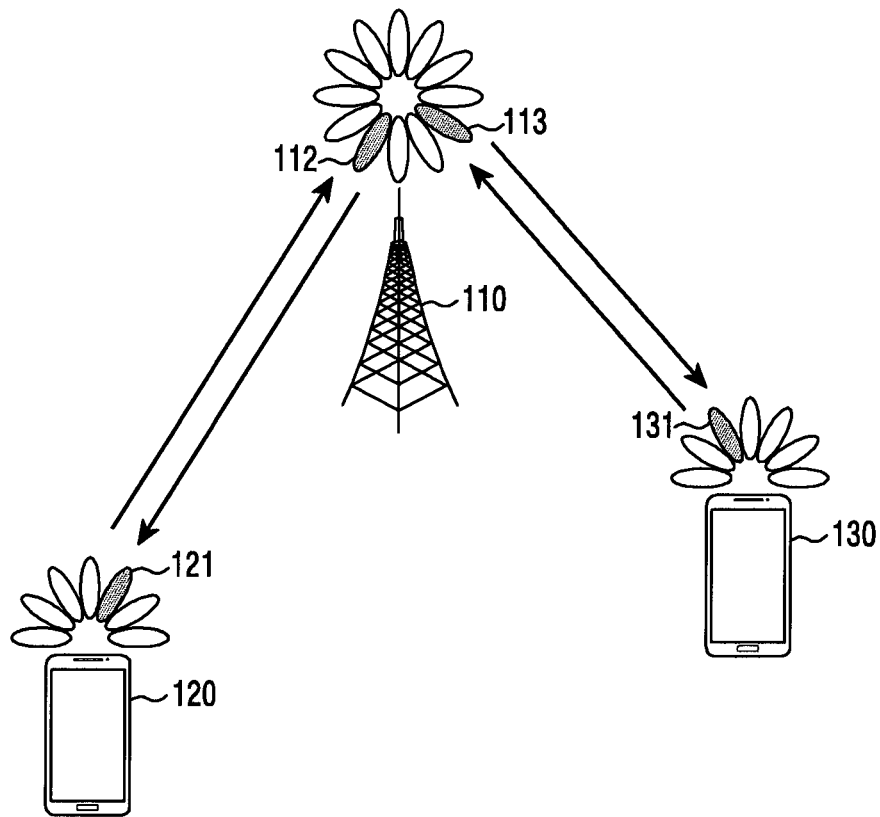
[Fig. 2]
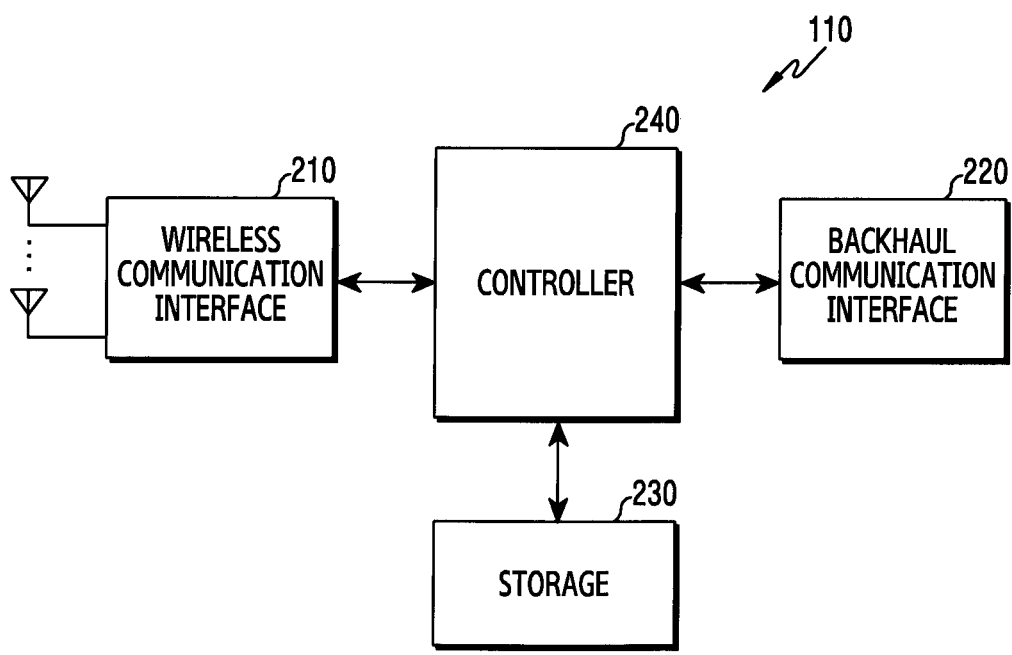

[Fig. 3]
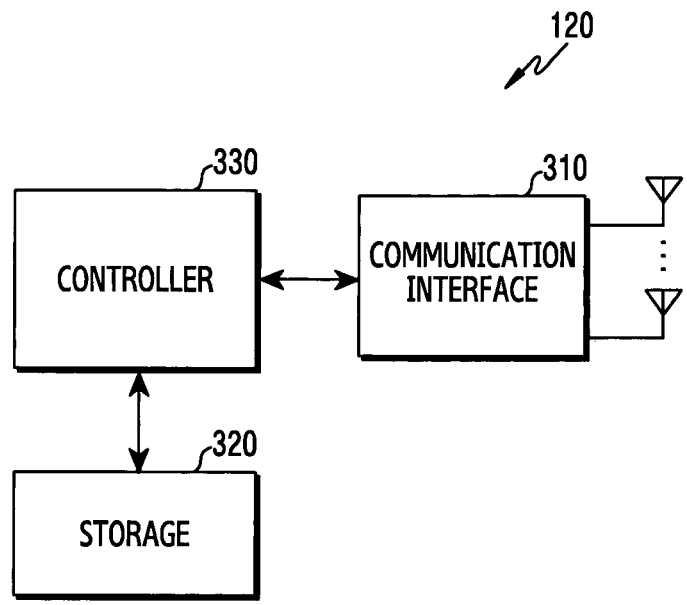
[Fig. 4]
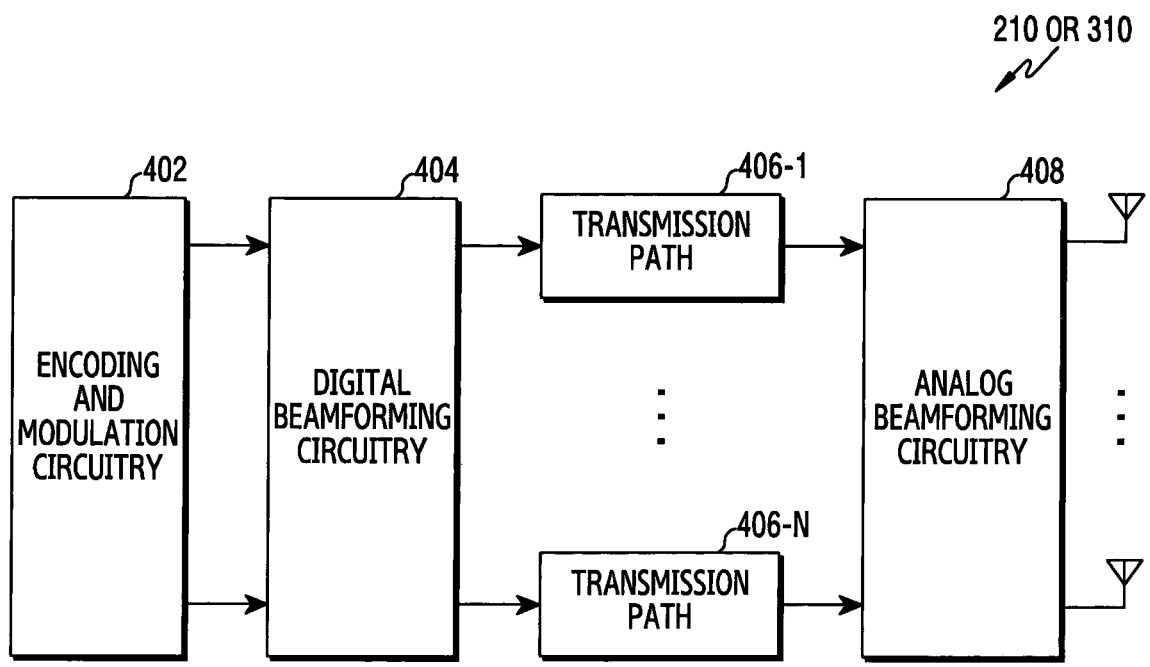

[Fig. 5]
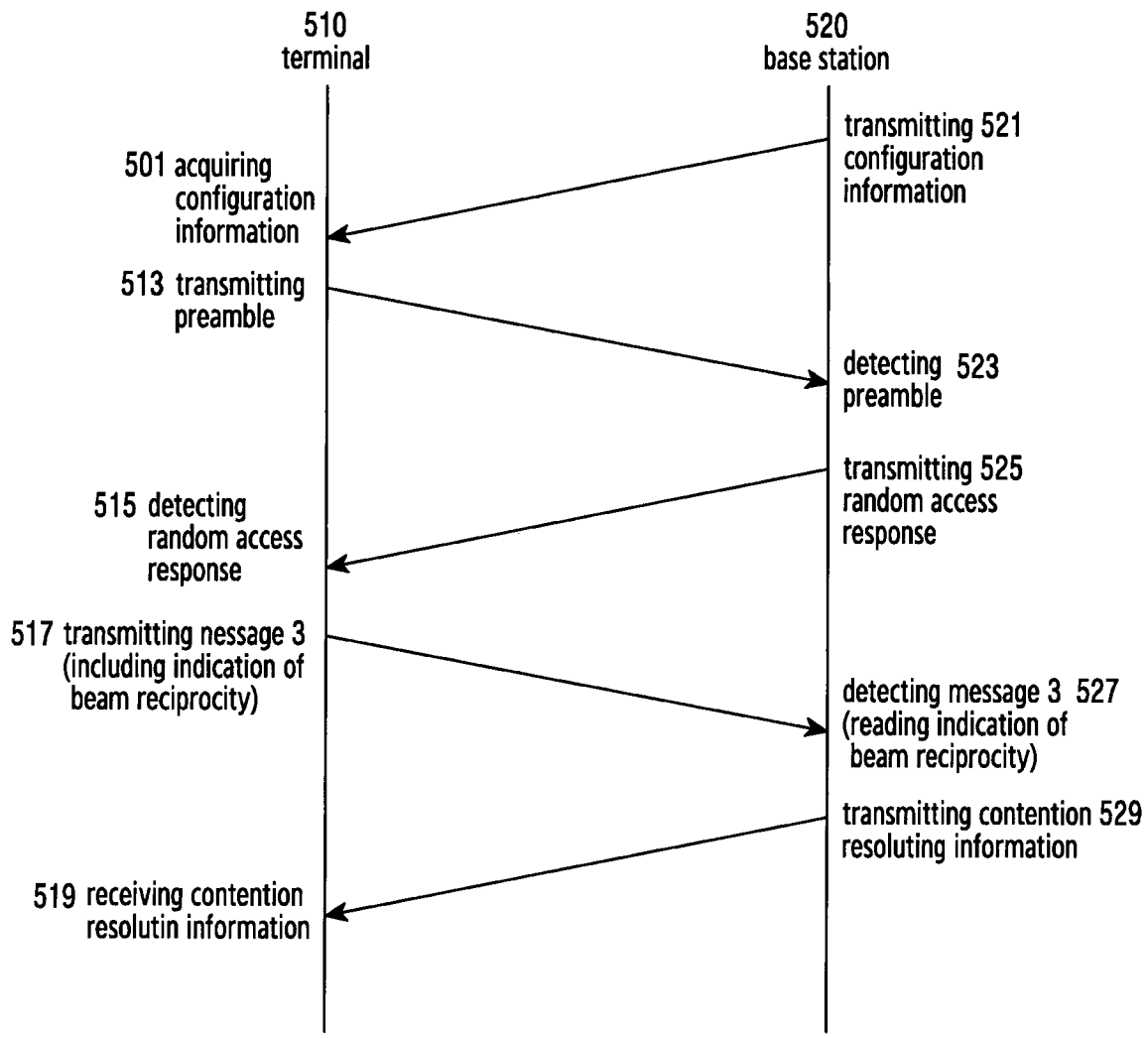
[Fig. 6]
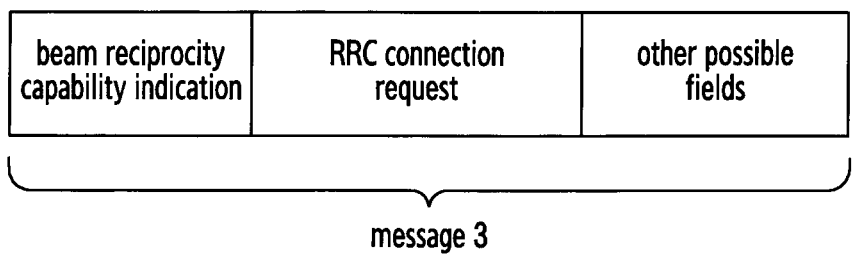

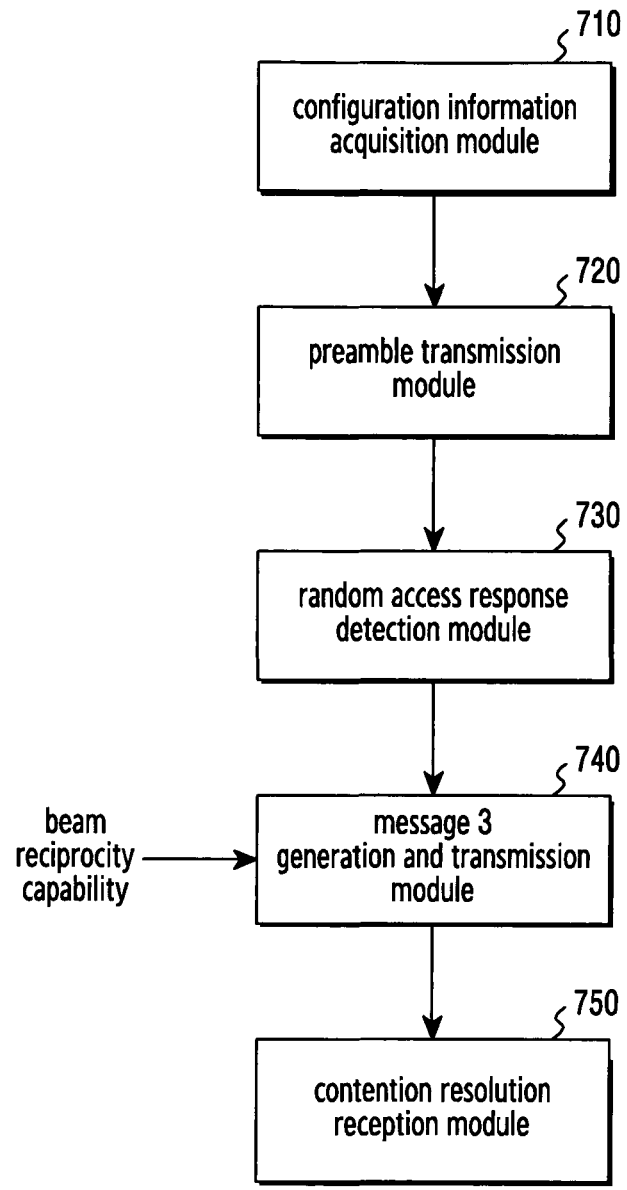
[Fig. 7]

[Fig. 8]
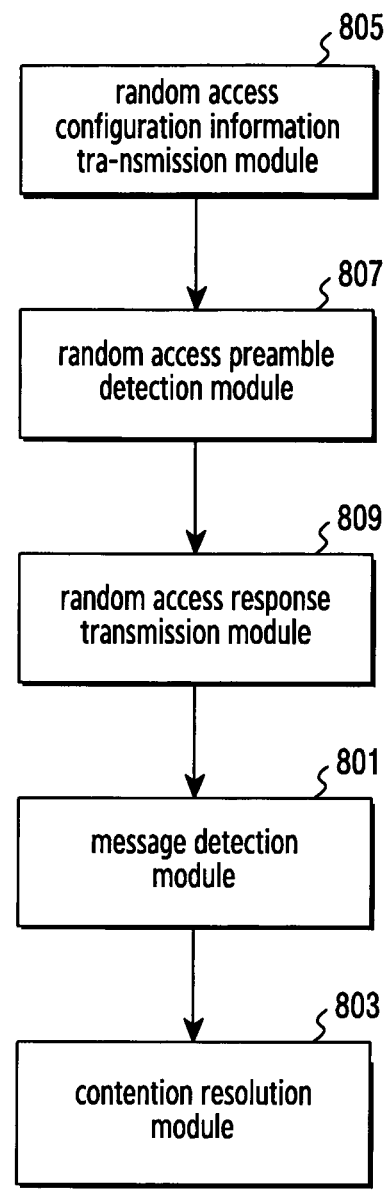

[Fig. 9]

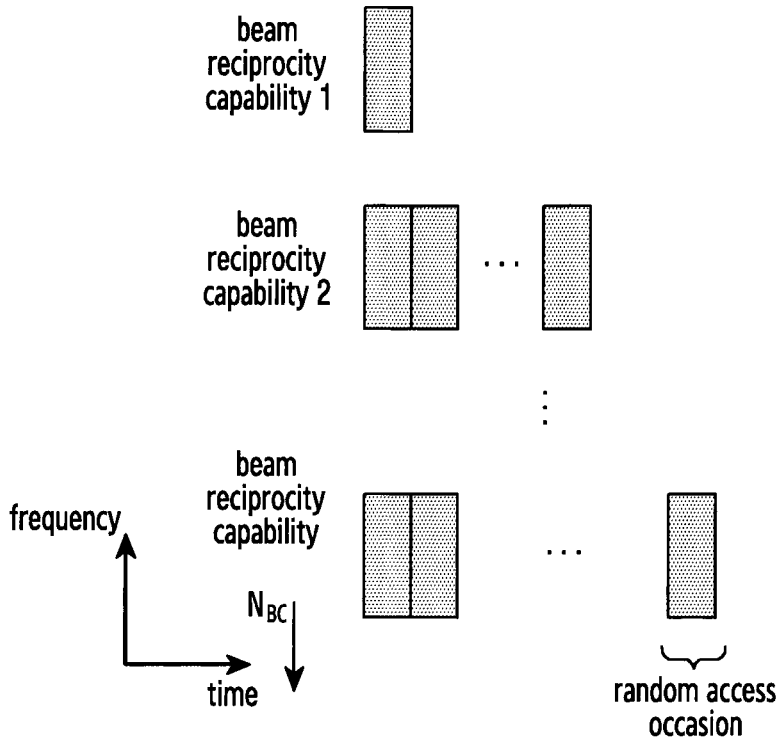

[Fig. 10]

| number of subsets N | start index of preamble in subset 1 | number of preambles in subset 1 | number of preambles in subset 2 | ... | number of preambles in subset N |

[Fig. 11]

| number of subsets N | number of preambles | start index of preamble in subset 1 | start index of preamble in subset 2 | ... | start index of preamble in subset N |

[Fig. 12]

| number of subsets N | number of basic sequences | start index of basic sequence | index scope of cover code |

[Fig. 13]
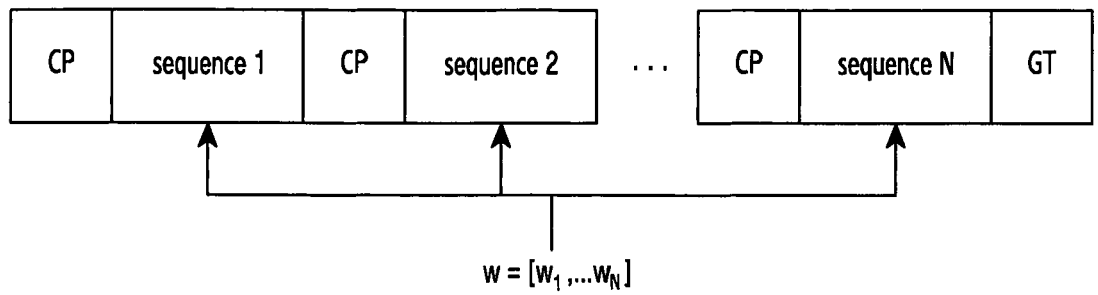
[Fig. 14]
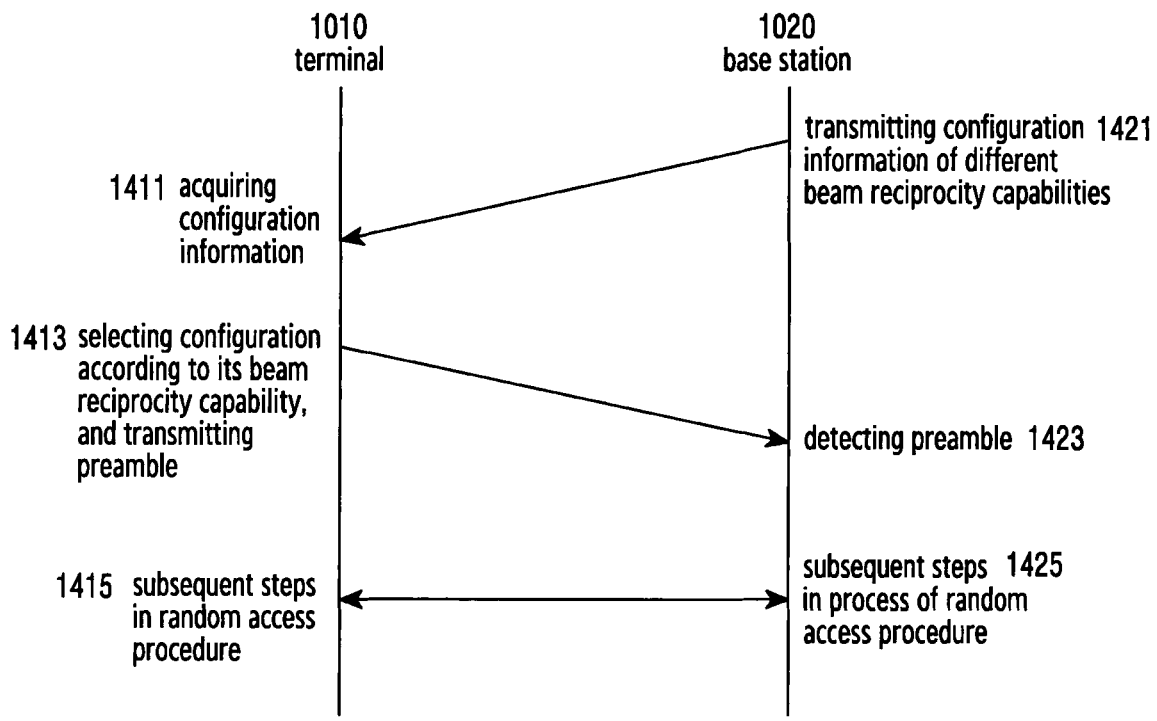

[Fig. 15]
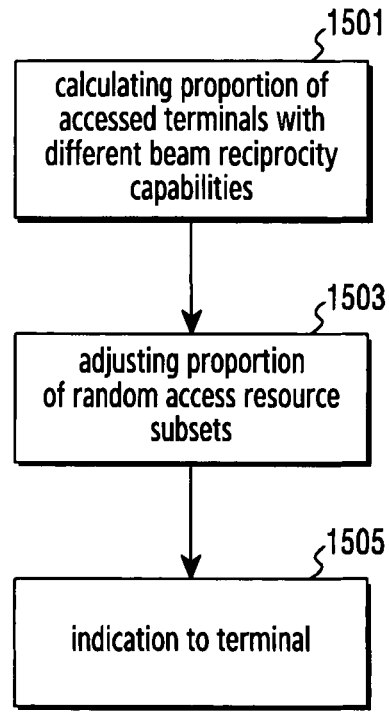
[Fig. 16]
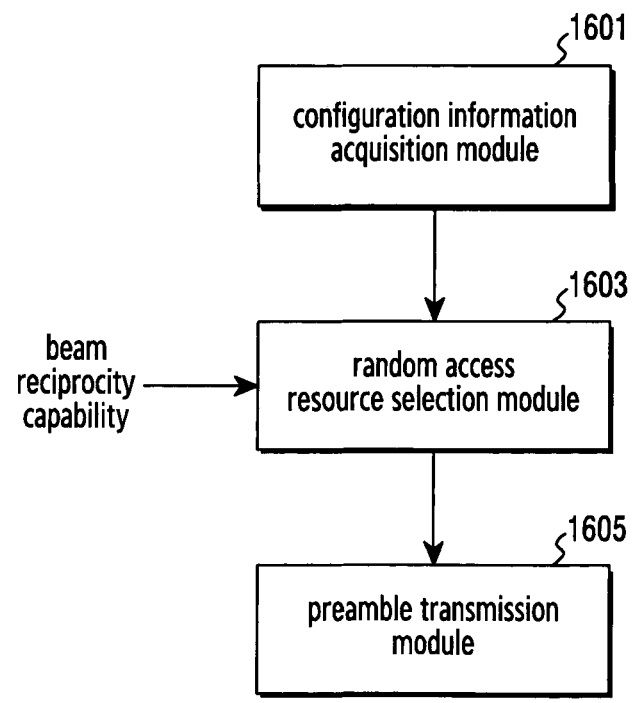

[Fig. 17]
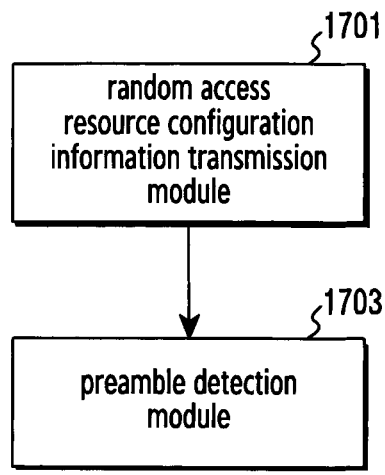
[Fig. 18]
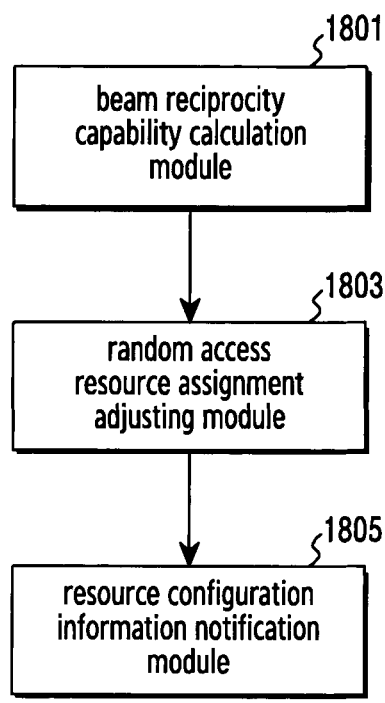

[Fig. 19]
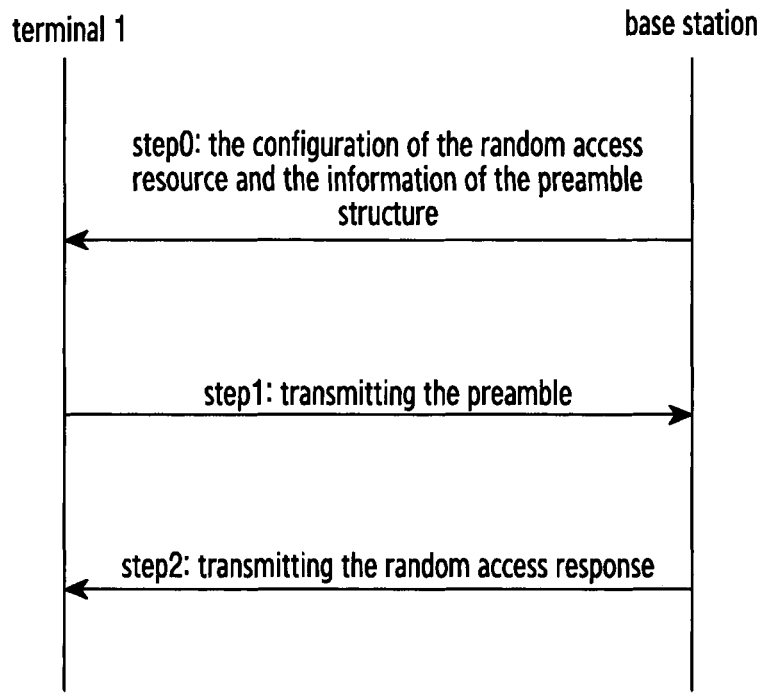
[Fig. 20]
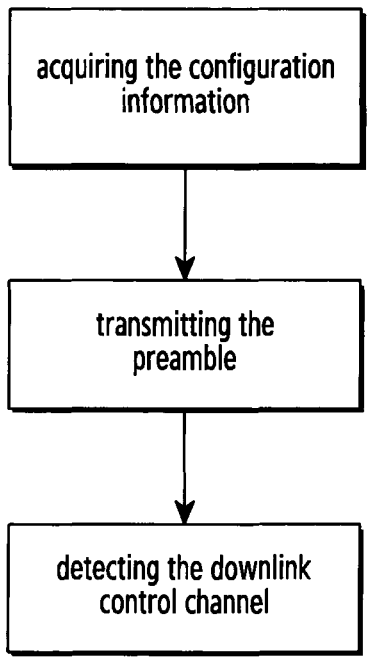

[Fig. 21]
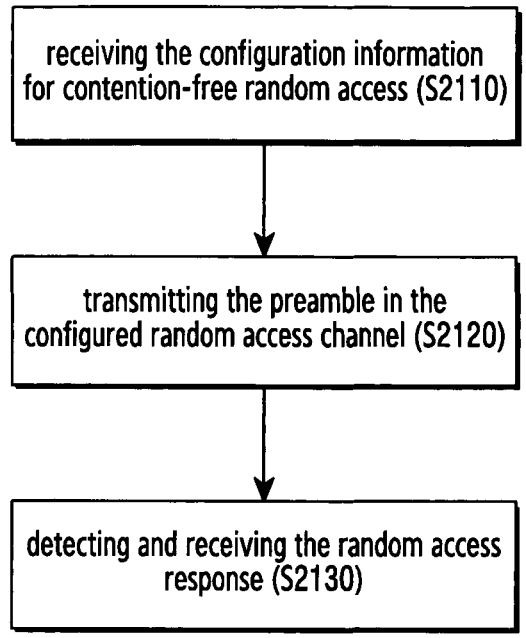
[Fig. 22]
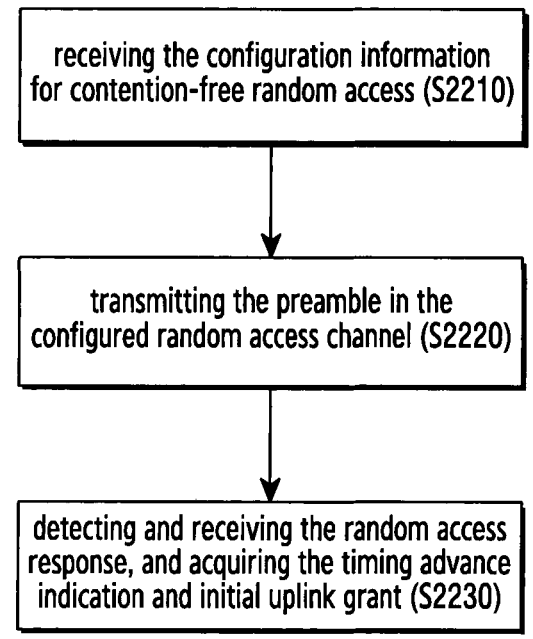

[Fig. 23]
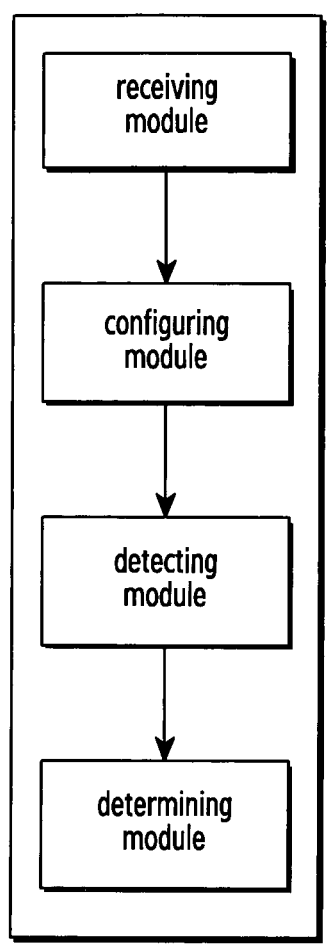

[Fig. 24A]
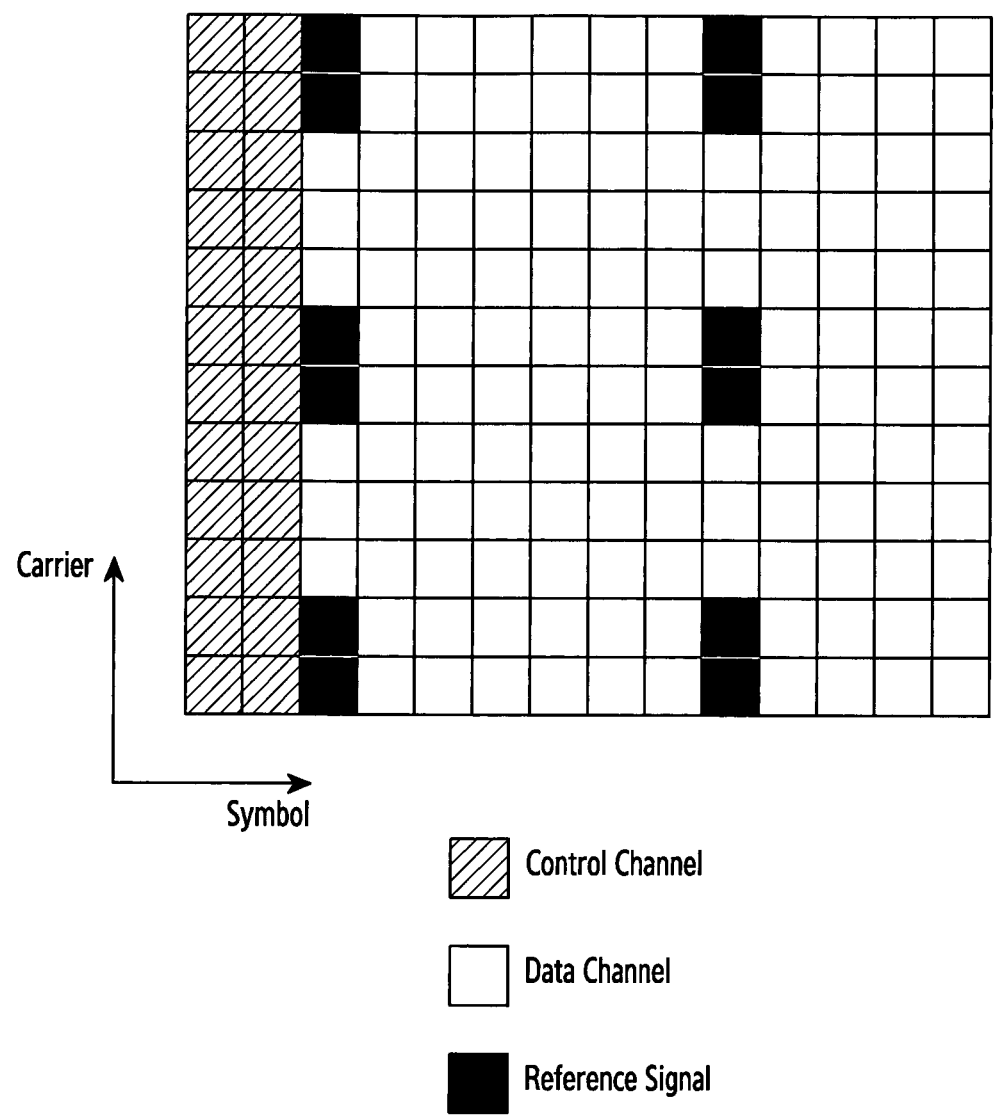

[Fig. 24B]
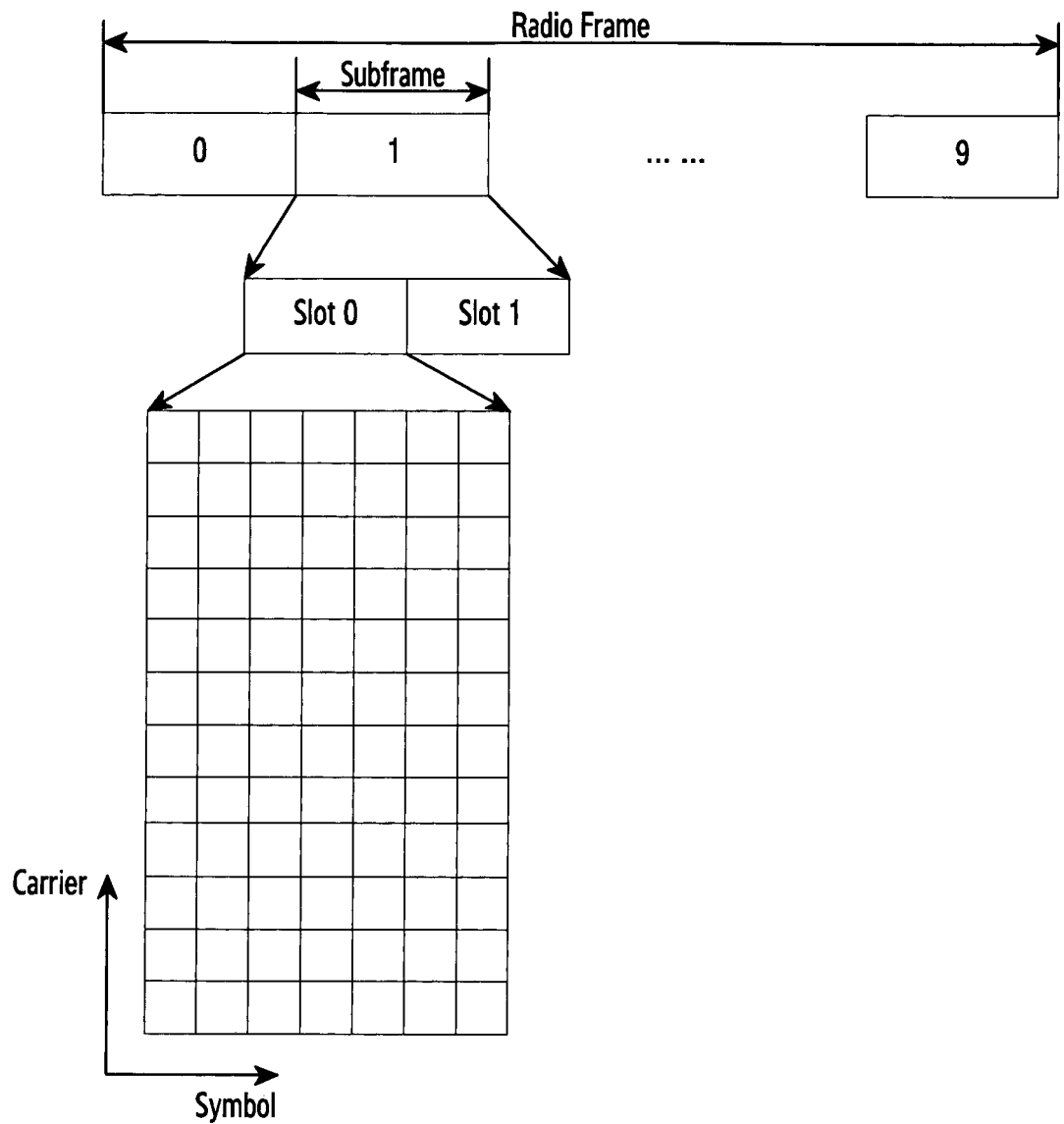

[Fig. 25]
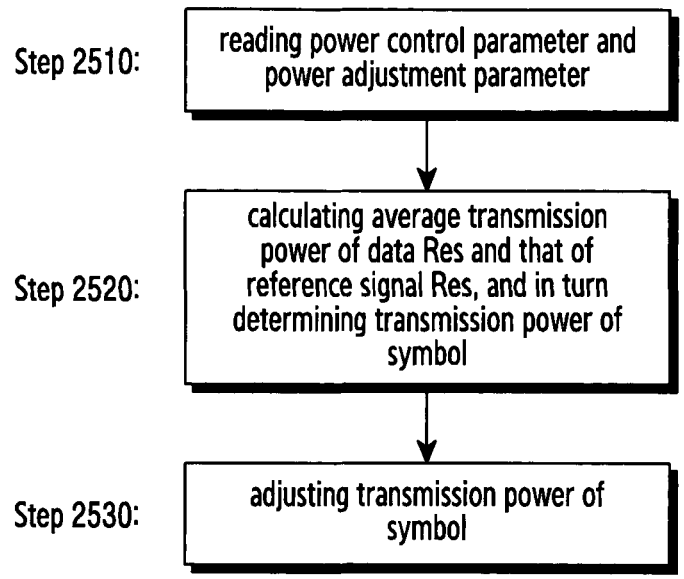
[Fig. 26]
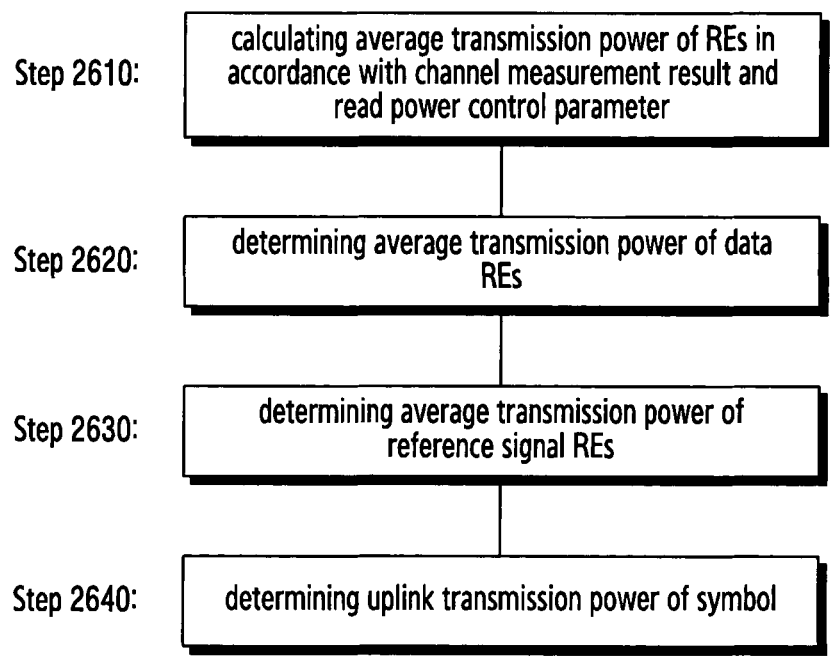

[Fig. 27]
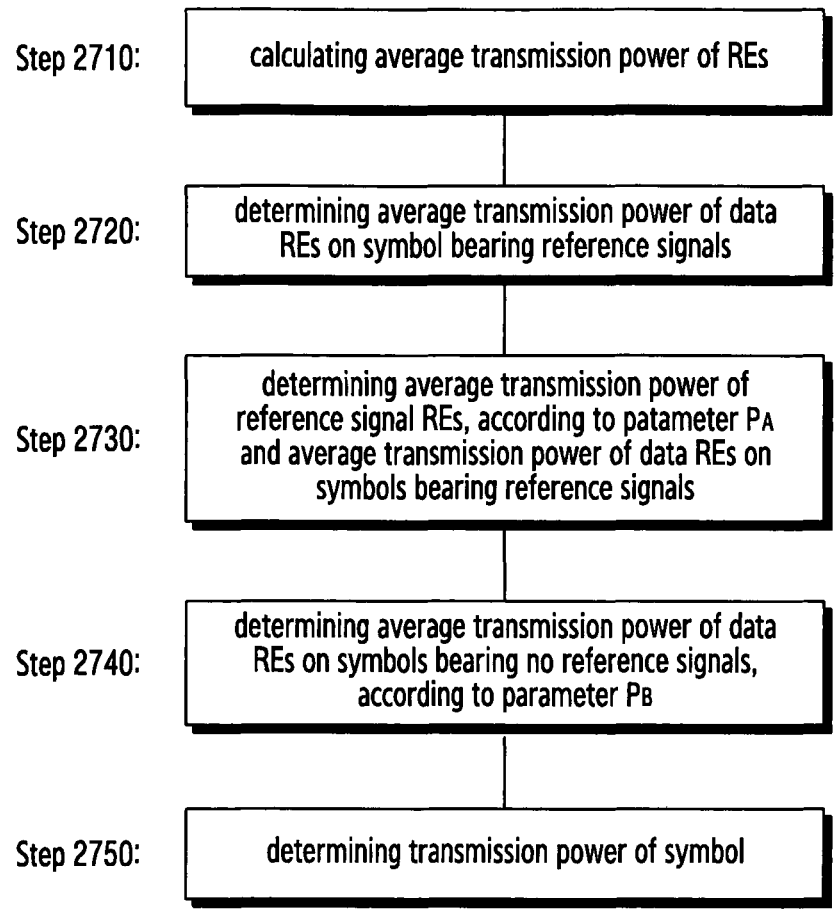

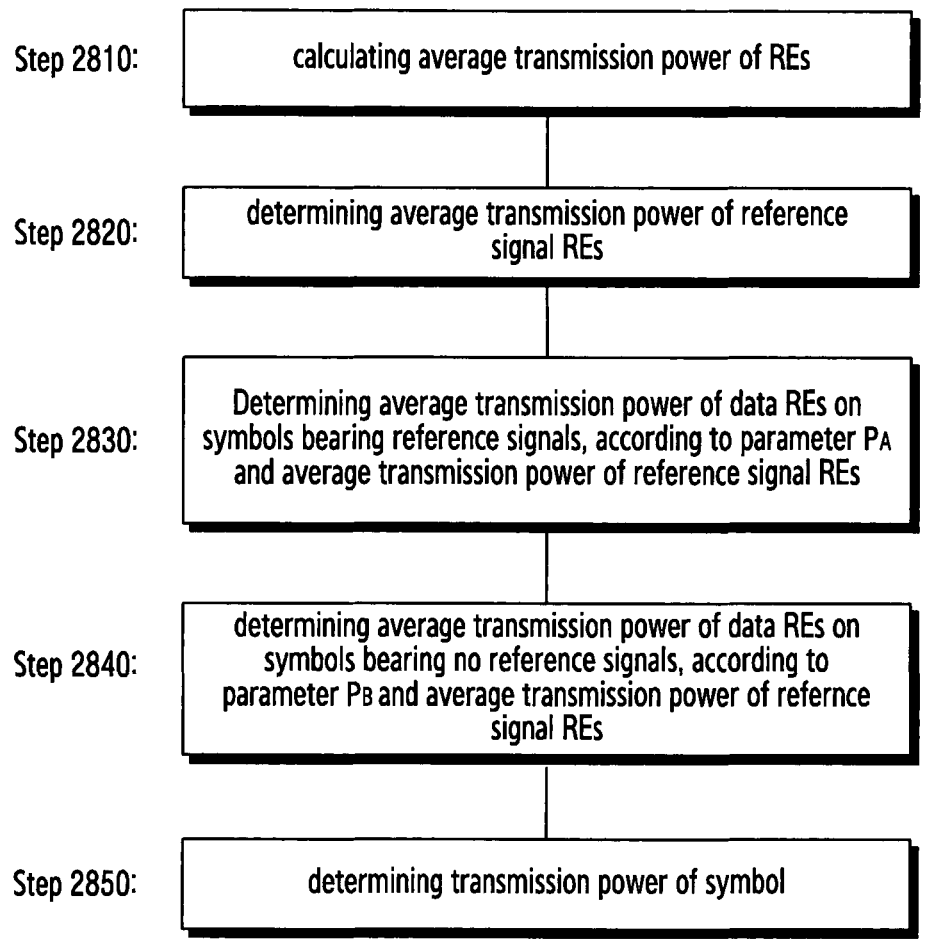
[Fig. 28]

[Fig. 29]
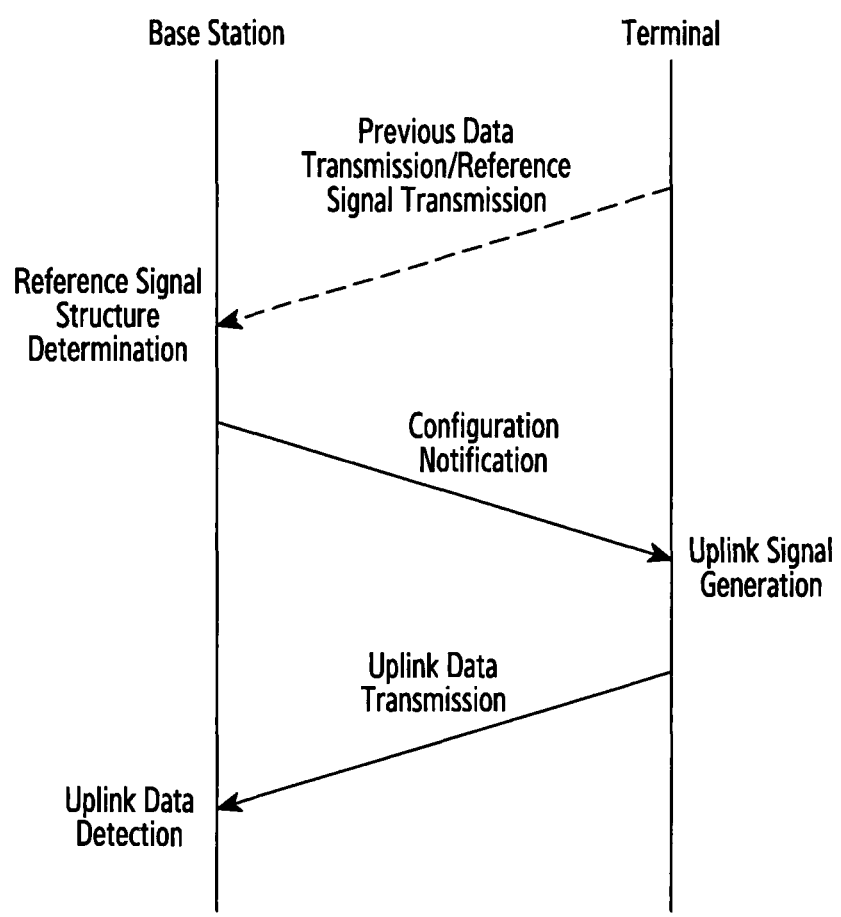

[Fig. 30]
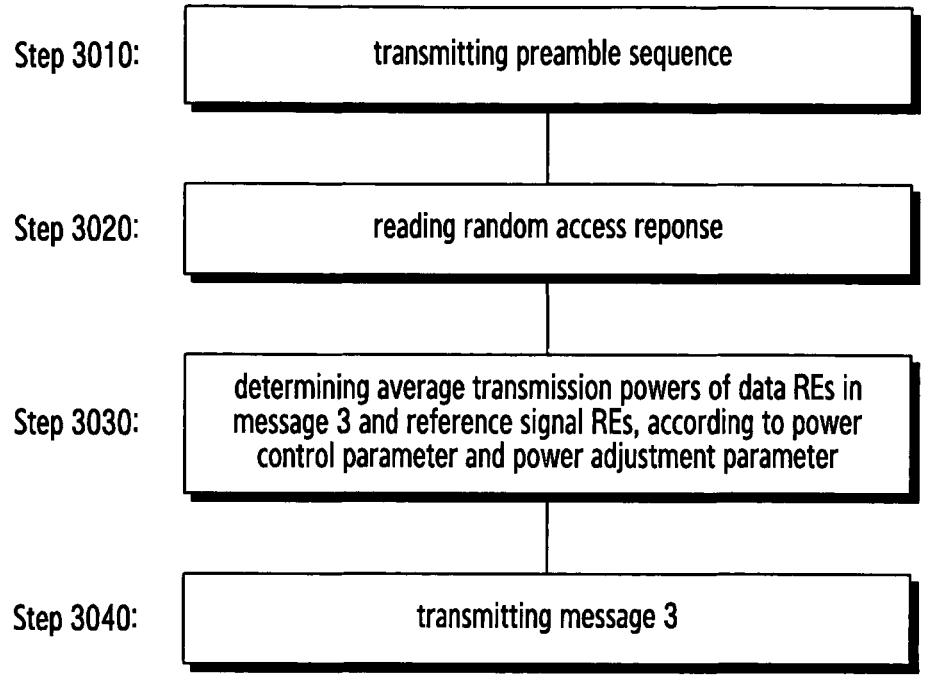
[Fig. 31]
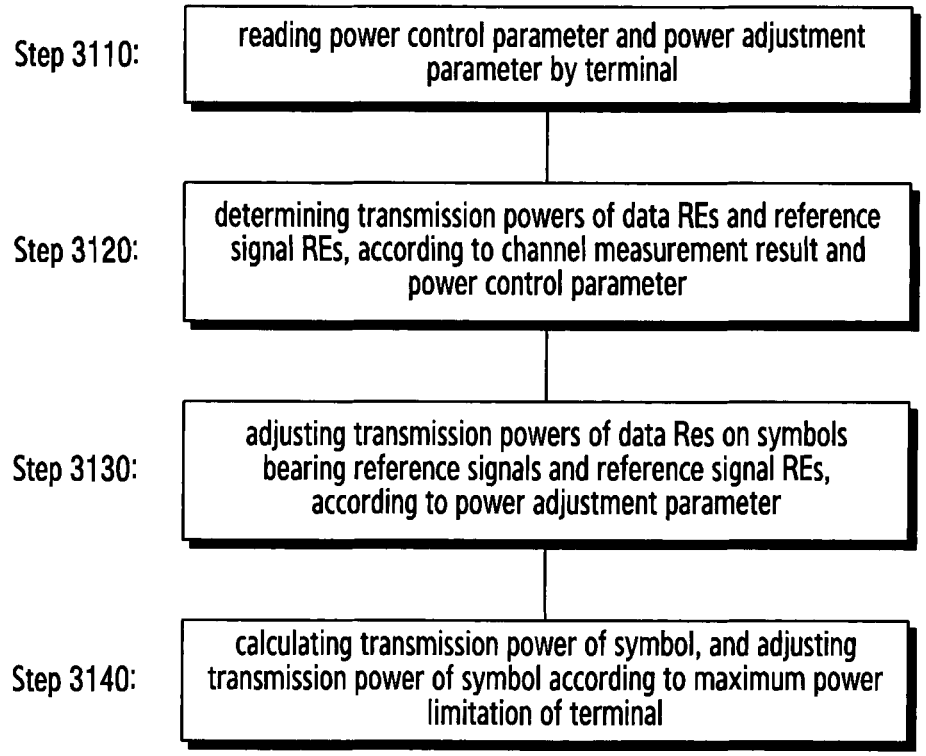

[Fig. 32]
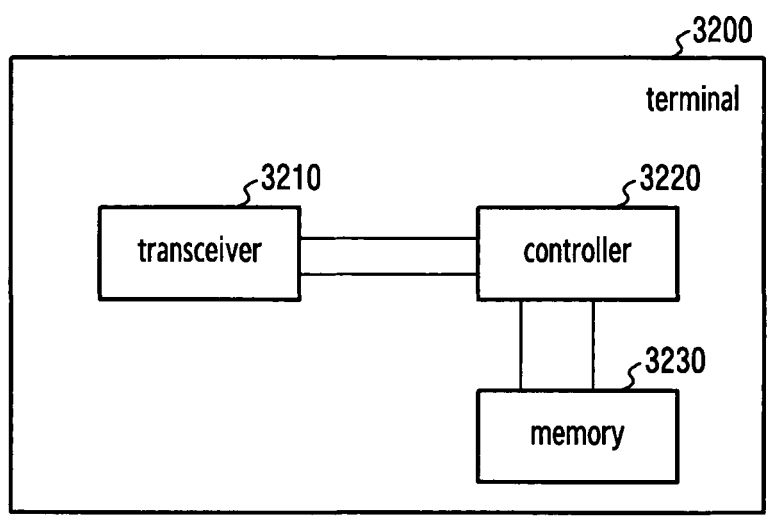

METHOD AND APPARATUS FOR CONTENTION-FREE RANDOM ACCESS AND UPLINK POWER CONTROL IN WIRELESS COMMUNICATION SYSTEM

CROSS-REFERENCE TO RELATED APPLICATIONS

This application is a 371 of International Application No. PCT/KR2018/003546 filed on Mar. 26, 2018, which claims priority to Chinese Patent Application No. 201710182844.6 filed on Mar. 24, 2017, Chinese Patent Application No. 201710182283.X filed on Mar. 24, 2017, and Chinese Patent Application No. 201810027589.2 filed on Jan. 11, 2018, the disclosures of which are herein incorporated by reference in their entirety.

BACKGROUND

1. Field

This disclosure generally relates to wireless communication systems. More specifically, this disclosure relates to a notification scheme for a beam reciprocity capability of a terminal, to a method and device for contention-free random access, to a method for uplink power control performed in a wireless communication network.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With rapid developments of the information industry, especially increasing requirements from a mobile Internet and an Internet of Things (IoT), a mobile communication technology would face unprecedented challenges in future. For example, according to a report of ITU-RM. [IMT.BEYOND 2020.TRAFFIC] from the International Telecommunication Union (ITU), it is expected that by 2020, an amount of the mobile traffic will grow by nearly 1,000 times compared to 2010 (4G era), a number of user equipment connections will be more than 17 billion, and with a gradual penetration of massive IoT equipments into the mobile communication network, the number of connected devices will be even more amazing. In response to this unprecedented challenge, the communications industry and academia have embarked on a wide range of fifth-generation mobile communication technology research (5G) to face the 2020s. Currently, a framework and overall objects of the future 5G have been currently discussed in the ITU's report of ITU-R M. [IMT.VISION], which provides a detailed description of the requirements outlook, application scenarios and various key performance indexes of the 5G. For the new requirements in 5G, the ITU's report of ITU-R M. [IMT.FUTURE TECHNOLOGY TRENDS) provides information on technical trends of the 5G, aimed to settle problems of a significant increasing in system throughput, a user experience consistency, a scalability, etc., in order to support the IoT, latency, energy efficiency, cost, network flexibility, emerging business and flexible spectrum utilization, etc.

A millimeter-wave communication is a possible key technology for the 5G. By increasing a carrier frequency to the millimeter-wave frequency band, an available bandwidth would be greatly increased, so a transmission rate of the system can be greatly improved. In order to overcome characteristics such as a high fading, a high loss and the like in a millimeter wave band wireless channel, the millimeter wave communication system generally adopts a beamforming technology, that is, by using weighting factors, beam energies are concentrated in a certain direction. In the case of wireless communication, a base station and a user equipment search a optimal beam pair by polling, etc., thereby maximizing a receiving signal-to-noise ratio at the user equipment.

In the millimeter-wave system, a beam reciprocity is defined as a case where a direction of the reception beam capable of achieving a maximum beamforming gain is as same as a direction of the transmission beam capable of achieving the maximum beamforming gain. When neither the terminal nor the base station has the beam reciprocity, the terminal and the base station has to traverse all possible beam pairs to find the beam pair with the maximum beamforming gain. When the terminal or the base station has the beam reciprocity, a beam management or a beam direction correction process would be greatly simplified, the terminal and the base station can find the beam pair with the maximum beamforming gain without traversing the all possible beam pairs.

For the base station, whether the terminal has the beam reciprocity can be considered as the terminal has the ability. If the base station can know whether the terminal has the beam reciprocity in time when or after the terminal accesses, appropriate time-frequency resources may be assigned to the terminal in processes of the resource assignment, the beam management, the beam correction, the cell handover, etc., so that a waste of system resources may be avoided and the efficiency of resource utilization is improved.

In the existing millimeter-wave system, there is no suitable signaling and process for the terminal to indicate the base station of its own beam reciprocity capability, resulting in that the utilization efficiency of the existing millimeter wave system is low and the resources cannot be allocated reasonably based on the terminal's beam reciprocity.

The random access process is an important method for the terminal in the system to establish a connection with the base station. In a Long Term Evolution (LTE) network, according to whether the same access resources (including the random access channel time-frequency resources and the random access preamble resources) are shared by multiple terminals, the random access processes are divided into the contention-based random access processes and contention-free random access processes.

In the contention-based random access processes, since multiple terminals may transmit preambles at the same time and the preambles transmitted by different terminals may be the same, there may be a conflict among the accesses for multiple terminals. A contention-based random access process is mainly used in the scenarios for initial access, a terminal in connection not synchronized in uplink but needing to send uplink data, or handover, or the like.

A contention-free random access process will not generate access conflicts, since it uses a dedicated preamble for random access, with the purpose being to speed up the average speed of business recovery so that the time of business recovery may be shorten. A contention-free random access process is mainly used in the scenarios that a terminal in connection is not synchronized in uplink but needs to send uplink feedback for receiving downlink data, or handover, or the like.

In FIG. 19, the flowchart of a contention-free random access process is illustrated. As shown in FIG. 19, before executing the contention-free random access process, a base station transmits the random access resource configuration and information of preamble structure to a terminal, and the subsequent contention-free random access process consists of two steps. In the first step, in a random access channel configured by a base station, the terminal transmits a random access preamble configured by the base station to the base station, and in the second step, the base station returns a random access response to the terminal.

In a contention-free random access process in an LTE network, after the terminal receives and successfully detects a preamble identifier matching the transmitted preamble, it may be determined that the contention-free random access process of the terminal succeeds.

In a 3GPP LTE (3rd Generation Partnership Project Long Term Evolution) system, an uplink power control (called as power control for short) is used for controlling a transmission power of a uplink physical channel in order to compensate for a pathloss and a shadow of the channel and suppress an inter-cell interference. Wherein, the uplink physical channel controlled by the uplink power control includes a Physical Uplink Shared Channels (PUSCH), a Physical Uplink Control Channel (PUCCH), and a Sounding Reference Signal (SRS). The uplink power control in the LTE employs a control manner combining an open loop manner and a closed loop.

In the LTE system, a transmission power of the PUSCH on a subframe i of a user equipment (UE) is defined as:

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\}[dBm]$$

wherein, dBm represents a decibel relative to one milliwatt, $P_{CMAX}$ is a maximum transmission power configured for the UE (configured UE transmission power), $P_{CMAX} = \min\{P_{EMAX}, P_{UMAX}\}$, wherein, $P_{EMAX}$ is a maximum allowed power configured by the system, $P_{UMAX}$ is a maximum UE power (maximum UE power) determined based on a UE power class;

$P_{PUSCH}'(i) = 10 \log_{10}(M_{PUSCH}(i)) + P_{O\_PUSCH}(j) + \alpha(j) \cdot PL + \Delta_{TF}(i) + f(i)$ is a transmission power of the PUSCH estimated by the UE based on open loop and closed loop instructions from a base station, a pathloss estimation, and a number of resource blocks of the PUSCH scheduled in the subframe i;

$M_{PUSCH}(i)$ is a transmission bandwidth in the subframe i, which is represented by a number of resource blocks (RBs);

$P_{O\_PUSCH}(j)$ is an open loop power control parameter, which is a sum of a cell specific quantity $P_{O\_NOMINAL\_PUSCH}(j)$ and a UE specific quantity $P_{O\_UE\_PUSCH}(j)$; wherein, j=0 corresponds to a semi-persistent scheduled PUSCH transmission, j=1 corresponds to a dynamic scheduled PUSCH transmission, and j=2 corresponds to a random access response scheduled PUSCH transmission;

$\alpha$ is a cell specific pathloss compensation factor, when j=0 or 1, $\alpha(j) \in \{0, 0.4, 0.5, 0.6, 0.7, 0.8, 0.9, 1\}$, and when j=2, $\alpha(j)=1$. $\alpha$=represents a full pathloss compensation, and $\alpha<1$ represents a partial pathloss compensation;

PL is a downlink pathloss estimate measured and calculated at the UE side;

$\Delta_{TF}(i)$ is a power bias associated with a Modulation Coding Scheme (MCS) manner;

f(i) is an adjustment state of the PUSCH power control. According to configurations of higher layers parameters, $f(i)=f(i-1)+\delta_{PUSCH}(i-K_{PUSCH})$ in a case of an accumulated value power control, and $f(i)=\delta_{PUSCH}(i-K_{PUSCH})$ in a case of an absolute value power control. $\delta_{PUSCH}$ is a UE specific closed loop correction value, and also called as a Transmission Power Control command (TPC command).

In the LTE system, a transmission power of the PUCCH on the subframe i of the UE is defined as:

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}[dBm]$$

wherein, $P_{CMAX}$ is defined as previous;

$P_{PUCCH}'(i) = P_{0\_PUCCH} + PL + h(n_{CQI}, n_{HARQ}) + \Delta_{F\_PUCCH}(F) + g(i)$ is a transmission power of the PUCCH estimated by the UE based on the open loop and closed loop instructions of the base station, the pathloss estimation, and a PUCCH format scheduled on the subframe i; PUC $P_{O\_PUCCH}$ is an open loop power control parameter, which is a sum of a cell specific quantity $P_{O\_NOMINAL\_PUCCH}$ and a UE specific quantity $P_{O\_UE\_PUCCH}$;

$\Delta_{F\_PUCCH}(F)$ is a power bias associated with a PUCCH format F, configured by the higher layer;

h(n) is a value based on the PUCCH format F, wherein, $n_{CQI}$ is a number of information bits of CQI, $n_{HARQ}$ is a number of bits of HARQ;

g(i) is an adjustment state of the current PUCCH power control, and $$g(i) = g(i-1) + \sum_{m=0}^{M-1} \delta_{PUCCH}(i-k_m),$$

$\delta_{PUCCH}$ is a UE specific closed loop correction value, and is also called as a TPC command.

It should be noted that, in the LTE system, in order to maintain a single-carrier characteristics of uplink signals, the PUSCH and PUCCH cannot be transmitted simultaneously for a same UE. Also, in the LTE system, because the uplink data transmission adopts a SC-FDMA waveform, only a UE-level power control can be performed, but a RB-level power control, even if a RE-level power control cannot be performed. Further, likely due to a limitation of the uplink channel waveform, forms of all reference signals adopted in the uplink transmission are continuous distribution in frequency domain, so that a channel estimation in a frequency domain is accurate but the accuracy of the channel estimation in a time domain of the uplink decreases when the UE is moving and there is Doppler frequency shift.

In current discussion for 5G, it has been already determined that a Cyclic-Prefix Orthogonal Frequency Division Multiplexing (CP-OFDM) technology will be adopted for the waveforms of both the uplink and the downlink. It is also determined that the uplink and the downlink adopt a same De-Modulation Reference Signal (DMRS), and in order to increase the accuracy of the time domain channel estimation, it is very likely for the uplink reference signals of 5G to adopt a manner similar to a mode of the LTE downlink channel reference signal, that is, the reference signals are discretely distributed both in the frequency domain and the time domain. In consideration of changes in a uplink reference waveform in 5G, the uplink power control in 5G can be changed to a RB-level or even a RE-level.

A problem to be addressed by the present disclosure is that, in the existing millimeter-wave system, there is no suitable signaling and process for the terminal to indicate the base station of its beam reciprocity capability, resulting in that in the current multiple beams operation system, the utilization efficiency and operation efficiency of the operation resource such as the resource assignment, the beam management, the beam correction, etc. is low and it is needed a new signaling and process for indicating the beam reciprocity capability of the terminal in order to enhance the operation efficiency and the resource utilization of the system.

SUMMARY

In one embodiment, a random access method of a terminal is provided. The method includes transmitting a message 3 including an indication of a beam reciprocity capability of the terminal if a random access response is detected successfully in the random access; and detecting a contention resolution information to complete the random access.

The random access method of the terminal further comprises: acquiring a random access configuration information including a random access channel configuration and a preamble resource pool information; determining a random access channel and a preamble according to the random access channel configuration and the preamble resource pool information, and transmitting the preamble on the random access channel; and detecting a random access response successfully if the random access response is detected within a random access response window and a preamble identifier corresponding to the transmitted preamble is detected in the random access response.

Wherein, the beam reciprocity capability is indicated by at least 1-bit indicator.

Wherein, the transmitted message 3 comprises at least a beam reciprocity capability indication field and a RRC connection request field; or wherein the RRC connection request field in the transmitted message 3 comprises the beam reciprocity capability indication field.

Wherein, before the message 3 is transmitted, the message 3 to be transmitted is encoded by channel coding, added a CRC, and added a mask corresponding to the beam reciprocity capability after the CRC is added.

Wherein, the beam reciprocity capability comprises no beam reciprocity capability and full beam reciprocity capability.

Wherein the beam reciprocity capability comprises no beam reciprocity capability, full beam reciprocity capability and partial beam reciprocity capability.

In another embodiment, a random access method of a base station is provided. The method includes detecting a message 3 including an indication of a beam reciprocity capability of a terminal after transmitting a random access response; and transmitting a contention resolution information based on a competition result.

The random access method of the base station further comprises, before the random access response is transmitted: transmitting a random access configuration information including a random access channel configuration and a preamble resource pool information; detecting a random access preamble on the configured random access channel; and determining and transmitting the random access response according to the detected random access preamble information.

In yet another embodiment, a random access apparatus of a terminal is provided. The random access apparatus includes a message 3 generation and transmission module configured to generate and transmit a message 3 including an indication of a beam reciprocity capability of the terminal; and a contention resolution reception module configured to detect a contention resolution information to complete the random access.

The random access apparatus of the terminal further comprises: a configuration information acquisition module configured to acquire a random access configuration information including a random access channel configuration and a preamble resource pool information; preamble transmission module configured to determine a random access channel and a preamble according to the random access channel configuration and the preamble resource pool information, and transmit the random access preamble signal on the random access channel; and a random access response detection module configured to detect a random access response transmitted from the base station within a random access response window, decide a successful detection of the random access response if a preamble identifier corresponding to the transmitted preamble is detected in the random access response, and acquire a message 3 from the random access response.

In yet another embodiment, a random access apparatus of a base station is provided. The random access apparatus includes a message detection module configured to detect a message including an indication of a beam reciprocity capability of a terminal after a random access response is transmitted; and a contention resolution module configured to transmit a contention resolution information according to a competition result.

The random access apparatus of the base station further comprises: a random access configuration information transmission module configured to transmit a random access configuration information including a random access channel configuration and a preamble resource pool information; a random access preamble detection module configured to detect a random access preamble on a configured random access channel; and a random access response transmission module configured to determine and transmit a random access response according to the detected random access preamble information.

In yet another embodiment, a method for determining a random access resource by a terminal is provided. The method includes acquiring a random access resource configuration information including random access resource subset configuration situations assigned to terminals with different beam reciprocity capabilities, wherein the random access resource for terminals with different beam reciprocity capabilities comprises one of a random access channel time-frequency resource and preamble resource pool information; selecting a corresponding random access resource subset according to its beam reciprocity capability, the selected random access resource subset comprises the random access channel time-frequency resource adapted to the terminal with the beam reciprocity capability or the preamble resource adapted to the terminal with the beam reciprocity capability; generating, by the terminal, a preamble according to the preamble resource information, and transmit the preamble on the random access channel time-frequency resource; and completing subsequent processes of random access procedure.

Wherein according to a value representing the subset of the beam reciprocity capability of the terminal, the random access resource is divided into a plurality of resource subsets without overlapping with each other, and each of the resource subsets corresponds to one type of beam reciprocity capability.

Wherein the preamble of the terminal is configured by one of following manners: Manner 1 is to configure the preamble of the terminal by indicating an initial preamble index of a first preamble subset and a number of the preambles in each preamble subset; Manner 2 is to configure the preamble of the terminal by indicating the initial preamble index of each preamble subset and a total number of the preambles; and Manner 3 is to configure the preamble of the terminal by indicating the first sequence index in a basic sequence resource pool, a number of the sequence in the basic sequence resource pool and an index scope of a cover code, wherein the preamble subset of the terminal is formed as follows: all preamble subsets use a same basic sequence pool, different preamble subsets use different codewords of the cover code, wherein each of the preamble subsets is consist of same or different sequences in the basic sequence resource pool, a cyclic prefix is added before each sequence of the each of the preamble subsets, a guard time is added behind all sequences of each of the preamble subsets, and each elements in the each sequence of the each of the preamble subsets is multiplied with a corresponding element in the cover code.

Wherein the beam reciprocity capability comprises: no beam reciprocity capability and full beam reciprocity capability.

Wherein the beam reciprocity capability comprises: no beam reciprocity capability, full beam reciprocity capability and partial beam reciprocity capability.

In yet another embodiment, a method for assigning a random access resource by a base station is provided. The method includes transmitting a random access resource configuration information including random access resource subset configuration situations assigned to terminals with different beam reciprocity capabilities, wherein the random access resource for terminals with different beam reciprocity capabilities comprises one of a random access channel time-frequency resource and preamble resource pool information; detecting a transmission of a preamble, and determining the random access resource corresponding to the beam reciprocity capabilities; and completing subsequent processes of random access procedure.

The method for assigning the random access resource by the base station further comprises, before transmitting the random access resource configuration information: calculating a proportion of terminals with a full beam reciprocity capability, terminals with no beam reciprocity capability and terminals with a partial beam reciprocity capability, in order to adjust a proportion of random access resource subsets assigned to the terminals with the different beam reciprocity capabilities; and indicating the random access resource subsets to the terminals with the different beam reciprocity capabilities.

In yet another embodiment, an apparatus for determining a random access resource by a terminal is provided. The apparatus includes a configuration information acquisition module configured to acquire a random access resource configuration information including random access resource subset configuration situations assigned to terminals with different beam reciprocity capabilities, wherein the random access resource for terminals with different beam reciprocity capabilities comprises one of a random access channel time-frequency resource and preamble resource pool information; a random access resource selection module configured to select a corresponding random access resource subset according to its beam reciprocity capability, the selected random access resource subset comprises the random access channel time-frequency resource adapted to the terminal adapted to the beam reciprocity capability or the preamble resource adapted to the terminal with the beam reciprocity capability; and a preamble transmission module configured to generate a preamble according to the preamble resource information, and transmit the preamble on the random access channel time-frequency resource.

In yet another embodiment, an apparatus for assigning a random access resource by a base station is provided. The apparatus includes a random access resource configuration information transmission module configured to transmit a random access resource configuration information including random access resource subset configuration situations assigned to terminals with different beam reciprocity capabilities, wherein the random access resource for terminals with different beam reciprocity capabilities comprises one of a random access channel time-frequency resource and preamble resource pool information; and a preamble detection module configured to detect a transmission of a preamble, and determine the random access resource corresponding to the beam reciprocity capabilities; and completing subsequent processes of random access procedure.

The apparatus for assigning the random access resource by the base station further comprises: a beam reciprocity capability calculation module configured to calculate a proportion of terminals with various beam reciprocity capabilities; a random access resource assignment adjusting module configured to adjust the random access resource configuration information according to the proportion of the terminals with various beam reciprocity capabilities acquired by the calculation module, the random access resource configuration information includes random access resource subset configuration situations corresponding to the different beam reciprocity capabilities, wherein the random access resource for terminals with different beam reciprocity capabilities comprises one of a random access channel time-frequency resource and preamble resource pool information; and a resource configuration information notification module configured to indicate the adjusted random access resource configuration information to the terminals.

The present disclosure provides a scheme for indicating the beam reciprocity capability of the terminal, and the terminal can report the beam reciprocity capability of this terminal when the access is completed by transmitting the message 3 or selecting the random access resource in the process of random access procedure, so that the base station can acquire the beam reciprocity capability information of the terminal as early as possible. After acquiring the beam reciprocity capability information, the base station can manage subsequent processes such as scheduling, resource assignment, beam management, beam correction and the like more efficiently. With the method according to the present disclosure, the operation efficiency of the system can be increased, and the processes such as resource assignment, beam management, beam correction and the like can be more efficient.

In yet another embodiment, there is provided a method for contention-free random access, the method including: receiving the configuration information for a contention-free random access process, transmitting, based on the received configuration information, a preamble in the configured random access channel; detecting and receiving a random access response; and determining, based on the random access response, whether a contention-free random access process is successful or not, wherein the detecting of the random access response is performed in a downlink control channel.

In yet another embodiment, in method for the contention-free random access, the configuration information for a contention-free random access process is acquired from the signaling of higher layer when a handover is performed; and when it is determined that the contention-free random access process is successful, the initial uplink transmission is granted by the downlink control information (DCI).

In yet another embodiment, a method for detecting a random access response in a contention-free random access process performed by a terminal is provided, the method including: detecting the downlink control channel in a random access response window after the terminal transmits the preamble; continuing to detect the downlink control information, if the terminal detects the scrambled downlink control information matching the configured random access channel time-frequency resources and/or the preamble; decoding the downlink control information and determines whether the contention-free random access process is successful or not.

In yet another embodiment, there is provided a device for contention-free random access, the device comprising: receiving module, configured to receive configuration information for contention-free random access process; configuration module, configured to transmit, based on the received configuration information, the configured preamble in the configured random access channel; detecting module, configured to detect and receive a random access response in the downlink control channel; and determining module, configured to determine, based on the random access response, whether the contention-free random access process is successful or not.

By the methods and devices for contention-free access described above, the delay of communication and the complexity of processing may be reduced, and the reception procedure of random access response may be simplified, so that the access delay of the contention-free random access process may be reduced and the system performance may be improved.

The existing uplink power control in LTE is the UE-level, that is to say, the power control is performed in a bandwidth allocated to the UE collectively. This way of the power control cannot support the RB-level or even the RE-level power control. For channels having strong frequency selectivity, the UE-level uplink power control can cope with channel changes over the entire frequency band well, while the RB-level and even the RE-level power control can cope with a frequency selective fading incurred by a time delay well.

Additionally, characteristics of uplink waveforms in LTE results in a need for a frequency domain continuity of the reference signals, such that an energy increase of the reference signals can hardly be obtained. The transmissions of the reference signals and the data have a same power, such that the accuracy of the channel estimation at the base station side cannot be further increased, and would cause, in some cases, a decreasing of the uplink transmission achievable data rate.

In one embodiment, a method for uplink power control performed in a terminal in a wireless communication network is provided. The method includes determining at least one of an average transmission power of data resource elements (REs) and an average transmission power of reference signal REs, according to an average transmission power of REs on the uplink and acquired a power adjustment parameter; acquiring a first transmission power of symbols, on the basis of at least one of the determined average transmission power of the data REs and the average transmission power of the reference signal REs; and adjusting the first transmission power of the symbols to a second transmission power for transmitting the symbols, according to a maximum terminal transmission power and the first transmission power.

According to an aspect of the present disclosure, wherein, the power adjustment parameter comprises a ratio of the average transmission power of the reference signal REs to the average transmission power of the data REs.

According to an aspect of the present disclosure, wherein, the ratio of the average transmission power of the reference signal REs to the average transmission power of the data REs comprises a first ratio, wherein the first ratio is a ratio of the average transmission power of the reference signal REs to the average transmission power of the data REs on the resource block (RB).

According to an aspect of the present disclosure, wherein the method for the uplink power control further comprises: determining the average transmission power of the data REs on the RB as an average transmission power of the REs, and determining the average transmission power of the reference signal REs as a sum of the average transmission power of the data REs and the first ratio; and acquiring the first transmission power of the symbol, on the basis of the average transmission power of the data REs on the RB and the average transmission power of the reference signal REs, wherein a unit of each of the average transmission power of the REs, the average transmission power of the data REs on the RB, and the average transmission power of the reference signal REs is dBm, and a unit of the first ratio is dB.

According to an aspect of the present disclosure, wherein the ratio of the average transmission power of the reference signal REs to the average transmission power of the data Res comprises a second ratio and a third ratio, wherein the second ratio is a ratio of average transmission power of the reference signal REs to an average transmission power of the data REs in symbols containing the reference signal REs, and the third ratio is a ratio of the average transmission power of the reference signal REs to an average transmission power of data REs in symbols not containing reference signal REs.

According to an aspect of the present disclosure, the method for the uplink power control further comprises: determining the average transmission power of the data REs in symbols containing the reference signal REs as the average transmission power of the REs; determining the average transmission power of the reference signal REs as a sum of the average transmission power of the data REs in symbols containing reference signal REs and the second ratio; determining the average transmission power of the data REs in symbols not containing the reference signal REs as a difference value obtained by subtracting the third ratio from the average transmission power of the reference signal REs; and acquiring the first transmission power of the symbol, on the basis of the average transmission power of the reference signal REs, the average transmission power of the data REs in symbols containing the reference signal REs, and the average transmission power of the data REs in symbols not containing the reference signal REs, and wherein, a unit of each of the average transmission power of the REs, the average transmission power of the data REs in symbols containing the reference signal REs, and the average transmission power of the data REs in symbols not containing the reference signal REs is dBm, and a unit of each of the second ratio and the third ratio is dB.

According to an aspect of the present disclosure, the method for uplink power control further comprises: determining the average transmission power of the reference signal REs based on the average transmission power of the REs; determining the average transmission power of the data REs in symbols containing the reference signal REs as a difference value obtained by subtracting the second ratio from the average transmission power of the reference signal REs; determining the average transmission power of the data REs in symbols not containing the reference signal REs as a difference value obtained by subtracting the third ratio from the average transmission power of the reference signal REs; and acquiring the first transmission power of the symbol, on the basis of the average transmission power of the reference signal REs, the average transmission power of the data REs in symbols containing the reference signal REs, and the average transmission power of the data REs in symbols not containing the reference signal REs, and wherein, a unit of each of the average transmission power of the REs, the average transmission power of the reference signal REs, the average transmission power of the data REs in symbols containing the reference signal REs, and the average transmission power of the data REs in symbols not containing reference signal REs is dBm, and a unit of each of the second ratio and the third ratio is dB.

According to an aspect of the present disclosure, wherein the power adjustment parameter is included in a random access response received by the terminal.

According to an aspect of the present disclosure, wherein the power adjustment parameter is associated with a reference signal density.

According to an aspect of the present disclosure, wherein the power adjustment parameter comprises a parameter for adjusting a magnitude of the reference signal or a parameter for determining the average transmission power of the reference signal REs based on the average transmission power of the REs.

According to an aspect of the present disclosure, wherein the power adjustment parameter comprises a first parameter, the first parameter being used for determining the average transmission power of the reference signal REs and the average transmission power of the data REs on symbols containing the reference signal REs on the basis of the average transmission power of the REs.

According to an aspect of the present disclosure, wherein the average transmission power of the reference signal REs is determined as a sum of the average transmission power of the REs and the first parameter, and the average transmission power of data REs on symbols containing the reference signal REs is determined as a difference value obtained by subtracting the first parameter from the average transmission power of the REs, and wherein a unit of each of the average transmission power of the REs, the average transmission power of the reference signal REs on the RB, and the average transmission power of the data signal REs on symbols containing the reference signal REs is dBm, and a unit of first ratio is dB.

According to an aspect of the present disclosure, wherein the average transmission power of the REs of the uplink is acquired based on the power control parameter and a channel measurement result.

According to an aspect of the present disclosure, wherein the power adjustment parameter and the power control parameter are configured independently in different index tables or configured jointly in a same index table.

According to an aspect of the present disclosure, wherein the power control parameter and the first ratio are configured independently in different index tables or configured jointly in a same index table.

According to an aspect of the present disclosure, wherein the power control parameter, the second ratio, and the third ratio are configured in a way of one of: jointly configuring the power control parameter, the second ratio, and the third ratio in a same index table; independently configuring the power control parameter, the second ratio, and a ratio of the third ratio to the second ratio in different index tables; independently configuring the power control parameter, the third ratio, and a ratio of the second ratio to the third ratio in different index tables; and jointly configuring a reference signal structure, indices of symbols containing the reference signal REs, and indices of symbols not containing the reference signal REs in a same index table.

According to an aspect of the present disclosure, wherein the power adjustment parameter and the power control parameter are configured jointly in a same index table.

According to an aspect of the present disclosure, wherein the power adjustment parameter and the power control parameter are configured jointly in a same index table.

According to an aspect of the present disclosure, wherein the terminal acquires the power adjustment parameter from at least one of a downlink control channel and a higher signalling.

In another embodiment, a terminal performing uplink power control in a wireless communication network is provided. The terminal includes a transceiver configured to transmit and receive signals; a memory configured to store instructions; and a processor configured to, when executing the instructions stored in the memory, perform the steps of: determining at least one of an average transmission power of data resource elements (REs) and an average transmission power of reference signal REs, according to an average transmission power of the REs on the uplink and an acquired power adjustment parameter; acquiring a first transmission power of symbol, on the basis of at least one of the determined average transmission power of the data REs and the average transmission power of the reference signal REs; and adjusting the first transmission power of the symbol to a second transmission power for transmitting the symbol, according to a maximum terminal transmission power and the first transmission power.

According to an aspect of the present disclosure, wherein the power adjustment parameter comprises a ratio of the average transmission power of the reference signal REs to the average transmission power of the data REs.

According to an aspect of the present disclosure, wherein the ratio of the average transmission power of the reference signal REs to the average transmission power of the data REs comprises a first ratio, wherein the first ratio is a ratio of the average transmission power of the reference signal REs to the average transmission power of the data REs on a resource block (RB).

According to an aspect of the present disclosure, wherein the processor is further configured to: determine the average transmission power of the data REs on the RB as an average transmission power of the REs, and determine the average transmission power of the reference signal REs as a sum of the average transmission power of data REs and the first ratio; and acquire the first transmission power of the symbol, on the basis of the average transmission power of the data REs on the RB and the average transmission power of the reference signal REs, wherein, a unit of each of the average transmission power of the REs, the average transmission power of the data REs on the RB, and the average transmission power of the reference signal REs is dBm, and a unit of the first ratio is dB.

According to an aspect of the present disclosure, wherein the ratio of the average transmission power of the reference signal REs to the average transmission power of the data REs comprises a second ratio and a third ratio, wherein the second ratio is a ratio of the average transmission power of the reference signal REs to an average transmission power of the data REs in symbols containing the reference signal REs, and the third ratio is a ratio of the average transmission power of the reference signal REs to an average transmission power of the data REs in symbols not containing the reference signal REs.

According to another aspect of the present disclosure, the processor is further configured to: determine the average transmission power of the data REs in symbols containing the reference signal REs as the average transmission power of the REs; determine the average transmission power of the reference signal REs as a sum of the average transmission power of the data REs in symbols containing the reference signal REs and the second ratio; determine the average transmission power of the data REs in symbols not containing the reference signal REs as a difference value obtained by subtracting the third ratio from the average transmission power of the reference signal REs; and acquire the first transmission power of symbol, on the basis of the average transmission power of the reference signal REs, the average transmission power of the data REs in symbols containing the reference signal REs, and the average transmission power of the data REs in symbols not containing the reference signal REs, and wherein, a unit of each of the average transmission power of the REs, average transmission power of the data REs in symbols containing the reference signal REs, and the average transmission power of the data REs in symbols not containing the reference signal REs is dBm, and a unit of each of the second ratio and the third ratio is dB.

According to another aspect of the present disclosure, the processor is further configured to: determine the average transmission power of the reference signal REs based on the average transmission power of the REs; determine the average transmission power of the data REs in symbols containing the reference signal REs as a difference value obtained by subtracting the second ratio from the average transmission power of the reference signal REs; determine the average transmission power of the data REs in symbols not containing the reference signal REs as a difference value obtained by subtracting the third ratio from the average transmission power of the reference signal REs; and acquire the first transmission power of symbol, on the basis of the average transmission power of the reference signal REs, the average transmission power of the data REs in symbols containing the reference signal REs, and the average transmission power of the data REs in symbols not containing the reference signal REs, and wherein, a unit of each of the average transmission power of the REs, the average transmission power of the reference signal REs, the average transmission power of the data REs in symbols containing the reference signal REs, and the average transmission power of the data REs in symbols not containing the reference signal REs is dBm, and a unit of each of the second ratio and the third ratio is dB.

According to an aspect of the present disclosure, wherein the power adjustment parameter is included in a random access response received by the terminal.

According to an aspect of the present disclosure, wherein the power adjustment parameter is associated with a reference signal density.

According to an aspect of the present disclosure, wherein the power adjustment parameter comprises a parameter for adjusting a magnitude of the reference signal or a parameter for determining the average transmission power of the reference signal REs based on the average transmission power of the REs.

According to an aspect of the present disclosure, wherein the power adjustment parameter comprises a first parameter, the first parameter being used for determining the average transmission power of the reference signal REs and the average transmission power of the data REs on symbols containing the reference signal REs, on the basis of the average transmission power of the REs.

According to an aspect of the present disclosure, wherein the average transmission power of the reference signal REs is determined as a sum of the average transmission power of the REs and the first parameter, and the average transmission power of the data REs on symbols containing the reference signal REs is determined as a difference value obtained by subtracting the first parameter from the average transmission power of the REs, and wherein a unit of each of the average transmission power of the REs, the average transmission power of the reference signal REs, and the average transmission power of the data signal REs on symbols containing the reference signal REs is dBm, and a unit of the first ratio is dB.

According to an aspect of the present disclosure, wherein the average transmission power of the REs of the uplink is acquired based on the power control parameter and a channel measurement result.

According to an aspect of the present disclosure, wherein the power adjustment parameter and the power control parameter are configured independently in different index tables or configured jointly in a same index table.

According to an aspect of the present disclosure, wherein the power control parameter and the first ratio are configured independently in different index tables or configured jointly in a same index table.

According to an aspect of the present disclosure, wherein the power control parameter, the second ratio, and the third ratio are configured in a way of one of: jointly configuring the power control parameter, the second ratio, and the third ratio in a same index table; independently configuring the power control parameter, the second ratio, and a ratio of the third ratio to the second ratio in different index tables;

independently configuring the power control parameter, the third ratio, and a ratio of the second ratio to the third ratio in different index tables; and jointly configuring the reference signal structure, the index of a symbol containing reference signal REs, and index of a symbol not containing reference signal REs in a same index table.

According to an aspect of the present disclosure, wherein the power adjustment parameter and the power control parameter are configured jointly in a same index table.

According to an aspect of the present disclosure, wherein the power adjustment parameter and the power control parameter are configured jointly in a same index table.

According to an aspect of the present disclosure, wherein the terminal acquires the power adjustment parameter from at least one of a downlink control channel and a higher signalling.

In yet another embodiment, a method for operating a terminal in a wireless communication system is provided. The method includes transmitting a message including an indication of a beam reciprocity capability of the terminal if a random access response is detected in the random access; and detecting a contention resolution information to complete the random access.

In yet another embodiment, a method for operating a base station in a wireless communication system is provided. The method includes detecting a message including an indication of a beam reciprocity capability of a terminal after transmitting a random access response; and transmitting a contention resolution information based on a competition result.

In yet another embodiment, a method for operating a terminal in a wireless communication system is provided. The method includes determining at least one of an average transmission power of data resource elements (REs) and an average transmission power of reference signal REs, based on an average transmission power of REs on the uplink and pre-determined power adjustment parameter; determining a first transmission power of symbol based on at least one of the determined average transmission power of the data REs and the average transmission power of the reference signal REs; and adjusting the first transmission power of symbol to a second transmission power for transmitting the symbol based on a maximum terminal transmission power and the first transmission power.

The present disclosure provides a scheme for indicating a beam reciprocity capability of a terminal. Particularly, during a process of random access procedure, a base station is indicated of the beam reciprocity capability of the terminal by transmission of a message 3 or selection of a random access resource. The base station can know the beam reciprocity capability of the terminal when the terminal completes its process of random access procedure.

Compared with the prior art, with the method according to the present disclosure, the base station can know the beam reciprocity capability of the terminal as the terminal accesses, therefore an operation efficiency of the system can be increased by the beam reciprocity capability of the terminal in subsequence operations. For example, the base station can assign time-frequency resource to the terminal more efficiently, perform the operations such as the beam management, the beam direction correction and the like more efficiently in the multiple beam operation. With interactions among the base stations, the process such as the cell handover can be performed more efficiently.

At present, the optimizations proposed for random access in 5G networks are generally aimed at the contention-based random access process, and there are no optimizations for the contention-free random access process. Due to different scenarios between contention-based random access processes and contention-free random access processes, it is also expected for the contention-free random access process to be optimized.

In view of the lack of optimization of the contention-free random access process currently, the present disclosure solves the problem by simplifying the procedure of the reception of random access response, thereby reducing the delay in the procedure of the contention-free random access and improving the system performance.

The present disclosure provides a manner for uplink power control. Considering that uplink transmission waveform is based on CP-OFDM in 5G, a manner for uplink power control different from the conventional LTE can be adopted. By increasing the transmission power of the reference signal REs, the accuracy of the uplink channel estimation can be increased, thereby a reliability of uplink data transmission is increased. The technical solution provided by the present disclosure can be applied to different application scenes, and provides a different signalling control procedure which is applicable to various uplink reference signals including the uplink demodulation reference signals, sounding reference signals, and the like, as well as procedures such as the uplink data transmission and the random access.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 is an exemplary flowchart illustrating an interaction between a base station and a terminal according to a first embodiment of the present disclosure;

FIG. 6 is an exemplary view illustrating a structure of a message 3 carrying an indication of beam reciprocity capability by Manner 1 according to the first embodiment of the present disclosure;

FIG. 7 is an exemplary view illustrating a random access apparatus of the terminal according to the first embodiment of the present disclosure;

FIG. 8 is an exemplary view illustrating a random access apparatus of the base station according to the first embodiment of the present disclosure;

FIG. 9 is an exemplary view illustrating a possible resource assignment according to a second embodiment of the present disclosure;

FIG. 10 is an exemplary view illustrating a possible manner of preamble resource pool configuration and notification according to the second embodiment of the present disclosure;

FIG. 11 is an exemplary view illustrating another possible manner of the preamble resource pool configuration and notification according to the second embodiment of the present disclosure;

FIG. 12 is an exemplary view illustrating a further possible manner of the preamble resource configuration by a cover code;

FIG. 13 is an exemplary view illustrating a structure of the preamble of FIG. 11 according to the second embodiment of the present disclosure;

FIG. 14 is an exemplary flowchart illustrating an interaction between the base station and the terminal according to the second embodiment of the present disclosure;

FIG. 15 is an exemplary flowchart where the base station adjusts the random access resource assigned to the terminals with the different beam reciprocity capabilities in real time according to the second embodiment of the present disclosure;

FIG. 16 is an exemplary view illustrating an apparatus for determining the random access resource of the terminal according to the second embodiment of the present disclosure;

FIG. 17 is an exemplary view illustrating an apparatus for assigning the random access resource of the base station according to the second embodiment of the present disclosure; and FIG. 18 is an exemplary view illustrating an apparatus for assigning the random access resource of the base station according to the second embodiment of the present disclosure.

FIG. 19 illustrates a flowchart of a general contention-free random access process;

FIG. 20 illustrates a schematic diagram of a contention-free random access process according to the inventive concept of the present application;

FIG. 21 illustrates a flowchart of a contention-free random access process according to a third embodiment of the present disclosure;

FIG. 22 illustrates a flowchart of a contention-free random access process according to a fourth embodiment of the present disclosure; and FIG. 23 illustrates a block diagram of a device for contention-free random access according to some embodiments of the present disclosure.

FIG. 24A is a schematic diagram illustrating a structure of a reference signal according to one embodiment of the present disclosure;

FIG. 24B is a schematic diagram illustrating a wireless frame according to an embodiment of the present disclosure;

FIG. 25 is a flowchart illustrating a method for uplink power control according to one embodiment of the present disclosure;

FIG. 26 is a flowchart illustrating a detailed procedure of step 2520 of FIG. 25 according to one embodiment of the present disclosure in detail;

FIG. 27 is a flowchart illustrating a detailed procedure of step 2520 of FIG. 25 1 according to another embodiment of the present disclosure in detail;

FIG. 28 is a flowchart illustrating a detailed procedure of step 2520 of FIG. 25 according to a further embodiment of the present disclosure in detail;

FIG. 29 is a diagram illustrating an information interaction procedure between a base station and a terminal according to one embodiment of the present disclosure;

FIG. 30 is a flowchart illustrating a power control method of message 3 in a random access procedure according to one embodiment of the present disclosure;

FIG. 31 is a flowchart illustrating a method for uplink power control according to another embodiment of the present disclosure; and FIG. 32 is a block diagram of a structure of a terminal 3200 according to an embodiment of the present disclosure.

DETAILED DESCRIPTION

Thereafter, the present disclosure will be described in detail by referring to drawings.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for contention-free random access and uplink power control in a wireless communication system.

The terms referring to message, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may detect a message 3 including an indication of a beam reciprocity capability of a terminal after transmitting a random access response; and transmit a contention resolution information based on a competition result. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality ofRF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may transmit a message 3 including an indication of a beam reciprocity capability of the terminal if a random access response is detected successfully in the random access; and detect a contention resolution information to complete the random access. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Embodiment 1

In this embodiment, a method and an apparatus for reporting a beam reciprocity capability of a terminal would be discussed in connection with a specified wireless communication system, wherein information on the beam reciprocity capability of the terminal is carried explicitly by a message 3 in a process of random access procedure.

FIG. 5 is an exemplary flowchart illustrating an interaction between a base station and a terminal according to a first embodiment of the present disclosure. The wireless communication system shown in FIG. 5 comprises a terminal 510 and a base station 520 communicating with each other.

In order to realize to report the beam reciprocity capability of the terminal, detailed processes at the terminal are as follows.

Step 511: the terminal 510 acquires a random access configuration information including a random access channel configuration and a preamble resource pool information from System Information Blocks (SIBs).

Step 513: the terminal 510 determines a random access channel and preambles according to the random access configuration information and the preamble resource pool information, and transmits the random access preamble signal on the random access channel. Wherein the preambles are selected randomly from a preamble resource pool configured by the base station with equal probability.

Step 515: after transmitting the preambles, the terminal 510 detects a random access response within a random access response window, decides a successful detection of the random access response if the random access response is detected successfully and a preamble identifier corresponding to the transmitted preamble is detected in the random access response, and acquires information such as a uplink grant for a message 3, a occasion advance, a Temporary Cell-Radio Network Temporary Identifier (TC-RNTI), etc. from the random access response; and decides a unsuccessful random access if no random access response is detected successfully within the random access response window or the preamble identifier detected in the random access response is not corresponding to the transmitted preamble, and tries to another process of random access procedure after adjusting a power or a transmission beam.

Step 517: the terminal 510 transmits the message 3 on the time-frequency resource specified in the uplink grant, in the case that the random access response is detected successfully and the preamble identifier corresponding to the transmitted preamble is detected in the random access response. Wherein the message 3 includes an unique identifier of the terminal and an indication on whether the terminal 510 has the beam reciprocity capability.

Step 519: the terminal 510 detects contention resolution information after transmitting the message 3. If a terminal unique identifier included in the contention resolution information matches to the unique identifier of the terminal, the terminal 510 decides that a contention resolution succeeds and the random access succeeds; if the transmission of the message 3 fails or the terminal unique identifier included in the contention resolution information does not match to the unique identifier of the terminal 510, the terminal 510 decides that the contention resolution fails, and retries to another random access after adjusting the power or the transmission beam.

Correspondingly, in order to realize to report the beam reciprocity capability of the terminal, detailed processes at the base station are as follows.

Step 521: the base station 520 transmits the random access configuration information including a random access channel configuration and a preamble resource pool information in the System Information Blocks (SIBs).

Step 523: the base station 520 detects the transmission of the random access preamble on the random access channel.

Step 525: if the base station 520 detects the transmission of the preamble, the base station 520 determines respective parameters in the random access response according to information such as the detected preamble, a delay of the detected preamble, etc., and transmits the random access response on a downlink shared channel after detecting fixed or configured occasions behind the random access channel of the preamble.

Step 527: the base station 520 detects the message 3 on the uplink shared channel specified in resource assignment information of the uplink grant assigned in the random access response, and acquires the indication of the beam reciprocity capability of the terminal.

Step 529: the base station 520 transmits the contention resolution information according to the conflict result.

In the above-described process of random access procedure, the indication of the beam reciprocity capability of the terminal is added to the message 3. The indication of the beam reciprocity capability is used to indicate the base station whether the terminal has the beam reciprocity.

Regarding the indication of the beam reciprocity capability, a possible manner is for a case as follows: the terminal has no beam reciprocity (that is, an optimal transmission beam direction cannot be acquired based on an optimal reception beam direction), or has a full beam reciprocity (that is, the exact optimal transmission beam direction can be acquired based on the optimal reception beam direction). In this case, the indication of the beam reciprocity capability may be realized by 1-bit indication information, the value of 1 for the indication of the beam reciprocity capability represents that the terminal has the beam reciprocity, and the value of 0 for the indication of the beam reciprocity capability represents that the terminal has no beam reciprocity.

Regarding the indication of the beam reciprocity capability, another possible manner is for a case as follows: some terminals have no beam reciprocity (that is, an optimal transmission beam direction cannot be acquired based on an optimal reception beam direction); some terminals have the full beam reciprocity (that is, the exact optimal transmission beam direction can be acquired based on the optimal reception beam direction); and others have a partial beam reciprocity (that is, an estimation for the optimal transmission beam direction may be acquired based on the optimal reception beam direction, but a transmission beam scan is still required to determine the exact transmission beam direction in a specified beam direction scope including the optimal reception beam direction. In this case, the indication of the beam reciprocity capability may be represented by several bits instead of the 1-bit information. One possible indication scheme is shown in Table 1 below.

TABLE 1 exemplary indication of the beam reciprocity capability

| Index (Bit Representation) | Meaning of Value |
| --- | --- |
| 0(00) | Terminal has no beam reciprocity |
| 1(01) | Terminal has a weak beam reciprocity |
| 2(10) | Terminal has a strong beam reciprocity |
| 3(11) | Terminal has a full beam reciprocity |

In the example described above, the information with two bits are used to indicate the beam reciprocity capability of the terminal, wherein 00 denotes that the terminal has no beam reciprocity, 11 denotes that the terminal has the full beam reciprocity. 01 denotes that the terminal only has the weak partial beam reciprocity (that is, the transmission beam scan is still required in a large beam direction scope after the optimal reception beam direction is acquired); 10 denotes that the terminal has a strong partial beam reciprocity (that is, the transmission beam scan is performed in a small beam direction scope after the optimal reception beam direction is acquired).

Regarding how to determine the above strong partial beam reciprocity and the weak partial beam reciprocity, some preset criterions may be utilized. For example, one possible criterion may be as follows: a scan angle threshold of the transmission beam direction needed to be performed after the terminal acquires the optimal reception beam is set, and it is decided that the terminal has the weak partial beam reciprocity if the transmission beam scan scope needed to be performed for the terminal exceeds the preset threshold; and it is decided that the terminal has the strong partial beam reciprocity if the transmission beam scan scope needed to be performed for the terminal does not exceed the preset threshold.

Regarding how to determine the above strong partial beam reciprocity and the weak partial beam reciprocity, another possible criterion may be to decide according to a number of the transmission beam needed to be scanned by the terminal. For example, a maximum threshold number of the transmission beam in the transmission beam direction needed to be performed is set after the terminal acquires the optimal reception beam. It is decided that the terminal has the weak partial beam reciprocity if the number of the transmission beam needed to be scanned by the terminal exceeds the preset threshold; and it is decided that the terminal has the strong partial beam reciprocity if the number of the transmission beam needed to be scanned by the terminal does not exceed the preset threshold. It should be noted that the transmission beam described previously may be the transmission beam owned by the terminal, and also may be predetermined transmission beam with standard beam width.

In the above example, the terminal with the partial beam reciprocity may be further divided into two or four classes. In other possible schemes, the terminal with the partial beam reciprocity may be grouped as one class, or further divided into more classes. If the terminal with the partial beam reciprocity is divided into more classes, more bits are required to indicate the beam reciprocity.

information is selected from a s-TMSI of the terminal or a random value. The establishment cause information includes emergency (emergency), high priority access (highPriorityAccess), mobile terminal access (mt-Access), mobile originated signaling (mo-signaling), moble originated data (mo-data), delay tolerant access (delayTolerantAccess-v1020), mobile originated voice call (mo-VoiceCall-v1280) and other types.

Based on these fields in the RRC connection request of the message 3, a beam reciprocity capability indication field is added. For example, a possible beam reciprocity capability indication parameter is ue-beamCapability whose possible type may be no beam reciprocity (Non), full beam reciprocity (Full) and possible partial beam reciprocity (Perfect).

Wherein the type of the possible partial beam reciprocity may be further divided, such as various beam reciprocity levels (Partial-v1, Partial-v2, . . . ).

In the above manner, the RRC connection request may be written as follows.

```
RRCConnectionRequest ::=         SEQUENCE {
    ue-Identity                      InitialUE-Identity,
    establishmentCause               EstablishmentCause,
        ue-beamCapability                BeamCapability,
    spare                            BIT STRING (SIZE (1))
}
InitialUE-Identity ::=           CHOICE {
    s-TMSI                           S-TMSI,
    randomValue                      BIT STRING (SIZE (40))
}
EstablishmentCause ::=           ENUMERATED {
                                     emergency,   highPriority Access,
                                     mt-
Access, mo-Signalling,
                                     mo-Data,   delayTolerantAccess-v1020,
mo-VoiceCall-vl280, spare1}
BeamCapability ::=               ENUMERATED {
                                     Null, Perfect, (Partial), (Partial-v1),
(Partial-v2),...etc.
}
```

According to the structure of the above message 3 carrying the beam reciprocity capability in accordance with the present disclosure, three implementations may be utilized as follows.

Manner 1: a new field for transferring the indication of the beam reciprocity capability is added in the message 3. That is, the message 3 at least includes fields such as a beam reciprocity capability indication, a RRC connection request, etc., when the process of random access procedure is for an initial access, as illustrated in FIG. 6.

FIG. 6 is an exemplary view illustrating a structure of the message 3 carrying the indication of beam reciprocity capability by Manner 1 according to the present disclosure.

As illustrated in FIG. 6, with the Manner 1, the message 3 transmitted on the uplink shared channel includes the beam reciprocity capability indication field, the RRC connection request field and other possible fields. It should be noted that the structure shown in FIG. 6 is only an exemplary view, and positions of the respective fields may be changed actually.

Manner 2: a new field for indicating the beam reciprocity capability of the terminal is added in the RRC connection request of the message 3. The existing RRC connection request includes a terminal identity information (ue-Identity), an establishment cause information (establishmentCause) and reserved fields. Wherein the terminal identity Manner 3: after the message 3 is transferred to a physical layer, a CRC is added after information bits are channel coded, and a mask corresponding to the beam reciprocity capability one-to-one is added based on the CRC, in order to indicate the beam reciprocity capability of the terminal. For example, a special Radio Network Temporary Identity (RNTI) for identifying the beam reciprocity capability of the terminal may be set.

One possible manner may be as follows. Abeam correspondence RNTI (BC-RNTI) is defined to identify the beam reciprocity capability of the terminal. The BC-RNTI is a 16-bit sequence, its value range is continue values within [v1, v2], wherein v1 is a start point of the value range and v2 is an end point of the value range. v1 is used to represent that the terminal has no beam reciprocity, and v2 is used to represent that the terminal has the full beam reciprocity. Remaining values in the value range are used to represent the partial beam reciprocity capability with different levels. A number of the levels for all possible beam reciprocity capabilities including no beam reciprocity and the full beam reciprocity may be $N_{BC}=v2-v1+1$.

With this manner, the base station may descramble the CRC by the $N_{BC}$ possible masks corresponding to the beam reciprocity capabilities one-to-one after it detects and decodes the message 3, and attempts to perform the CRC check. If the CRC check is successful, the detection of the message 3 is successful, and the beam reciprocity capability of the corresponding terminal is the used corresponding beam reciprocity capability corresponding to the BC-RNTI.

FIG. 7 is an exemplary view illustrating a random access apparatus of the terminal according to the first embodiment of the present disclosure. Referring to FIG. 7, the random access apparatus of the terminal according to the first embodiment of the present disclosure comprises a configuration information acquisition module 710 configured to acquire a random access configuration information carried by a main information block or system information block indicated by the main information block in a broadcast channel, wherein the random access configuration information includes a random access channel configuration and a preamble resource pool information; a preamble transmission module 720 configured to determine a random access channel and a preamble according to the random access channel configuration and the preamble resource pool information, and transmit the random access preamble signal on the random access channel; a random access response detection module 730 configured to detect a random access response transmitted from the base station within a random access response window, decide a successful detection of the random access response if a preamble identifier corresponding to the transmitted preamble is detected in the random access response, and acquire a message 3 from the random access response; a message 3 generation and transmission module 740 configured to generate and transmit a message 3 including an indication on whether the terminal has the beam reciprocity capability in one of the Manners 1-3, according to the detected random access response and the beam reciprocity capability of the terminal; and a contention resolution reception module 750 configured to detect a reception contention resolution information to complete the random access.

FIG. 8 is an exemplary view illustrating a random access apparatus of the base station according to the first embodiment of the present disclosure. Referring to FIG. 8, the random access apparatus of the base station according to the first embodiment of the present disclosure comprises: a message detection module 801 configured to detect a message 3 including an indication of a beam reciprocity capability of a terminal after a random access response is transmitted; and a contention resolution module 803 configured to transmit a contention resolution information according to a competition result. The random access apparatus of the base station according to the first embodiment of the present disclosure further comprises: a random access configuration information transmission module 805 configured to transmit a random access configuration information including a random access channel configuration and a preamble resource pool information; a random access preamble detection module 807 configured to detect a preamble on a configured random access channel; and a random access response transmission module 809 configured to determine and transmit a random access response according to the detected random access preamble information.

According to the first embodiment of the present disclosure, the terminal can report the beam reciprocity capability of this terminal when the access is completed by transmitting the message 3 in the process of random access procedure, so that the base station can acquire the beam reciprocity capability information of the terminal as early as possible. After acquiring the beam reciprocity capability information, the base station can manage subsequent processes such as scheduling, resource assignment, beam management, beam correction and the like more efficiently. With the method according to the first embodiment of the present disclosure, the operation efficiency of the system can be increased, and the processes such as resource assignment, beam management, beam correction and the like can be more efficient.

Embodiment 2

In the second embodiment, a scheme for indicating the beam reciprocity capability would be discussed in connection with a specified wireless communication system, wherein the beam reciprocity capability is indicated by the random access resource used implicitly. For example, the various beam reciprocity capabilities of the terminals may be distinguished by the random access channel time-frequency resource or the random access preamble.

FIG. 9 is an exemplary view illustrating a possible resource assignment according to a second embodiment of the present disclosure, wherein the various beam reciprocity capabilities of the terminals are distinguished by resource division manners of the random access channel time-frequency resource.

In the wireless communication system, a parameter $N_{BC}$ representing a number of subsets of the beam reciprocity capability of the terminal is defined in advanced, wherein $N_{BC} \geq 1$. $N_{BC}=1$ represents that the system would not distinguish the terminal with the beam reciprocity capability and the terminal with no beam reciprocity capability, namely, the number of the subset is 1; $N_{BC}=2$ represents that the system would only distinguish the terminal with the full beam reciprocity capability and the terminal with no beam reciprocity capability, namely the number of the subsets is 2, wherein the terminal that cannot determine the optimal transmission beam directly by the optimal reception beam would be seemed as having no beam reciprocity capability; and $N_{BC}>2$ represents that the system would further identify the terminal with the partial beam reciprocity capability, namely the number of the subsets is $N_{BC}$, which is the transmission beam scan scope or a scan number of the transmission beams required after the terminal acquires the optimal reception beam and is used to distinguish the terminal with different partial beam reciprocity capabilities.

The base station may divide the random access resource into $N_{BC}$ resource subsets without overlapping with each other based on the value of $N_{BC}$, and each of the resource subsets corresponds to one type of beam reciprocity capabilities. The base station indicates these $N_{BC}$ random access channel time-frequency resource subsets to the terminal via the broadcast channel, or the main information block in the broadcast channel, or the SIB indicated by the main information block in the broadcast channel.

In the example illustrated in FIG. 9, the random access channel time-frequency resources assigned to the terminals with different beam reciprocity capabilities are divided in a manner of frequency division.

In FIG. 9, the number of the subsets of the beam reciprocity capabilities of the terminal is $N_{BC}$, a first subset includes the terminals with the beam reciprocity capability 1, namely the terminals with the full beam reciprocity capability; a $N_{BC}$th subset includes the terminals with the beam reciprocity capability $N_{BC}$, namely the terminals with no beam reciprocity capability. A second subset to the NBcth subset include the terminals with the partial beam reciprocity capabilities which increase sequentially in an order of the subset number.

Meanwhile, a plurality of random access occasions may be assigned to the terminals with the partial beam reciprocity capability and the terminals with no beam reciprocity capability, in order to perform the transmission beam scan by the terminal.

As another assignment manner, only one random access occasion is assigned to both the terminals with the partial beam reciprocity capability and the terminals with no beam reciprocity capability, and the transmission beam scan is performed by a random access retry.

As still another assignment manner, the random access channel time-frequency resources assigned to the terminals with different beam reciprocity capabilities are divided in a manner of time division.

It should be noted that, when the time-frequency resources assigned to the terminals with the different beam reciprocity capabilities are divided according to the resource, the terminals with the different beam reciprocity capabilities may use a same preamble resource pool.

FIG. 10 is an exemplary view illustrating a possible manner of preamble resource pool configuration and notification according to the second embodiment of the present disclosure; FIG. 11 is an exemplary view illustrating another possible manner of the preamble resource pool configuration and notification according to the second embodiment of the present disclosure; FIG. 12 is an exemplary view illustrating a further possible manner of the preamble resource configuration by a cover code. FIGS. 6-8 distinguish the different beam reciprocity capabilities of the terminals by the random access preamble. Wherein the random access preambles are divided into $N_{BC}$ subsets without overlapping with each other, and each of the subsets corresponds to one type of the beam reciprocity capability. The base station indicates these $N_{BC}$ preamble subsets to the terminal via the broadcast channel, or the main information block in the broadcast channel, or the SIB indicated by the main information block in the broadcast channel.

Referring to FIG. 10, a possible preamble index scope in each of the preamble subsets is indicated by indicating an initial preamble index in the first subset and a number of the preambles in each subset. The number N of subsets, namely $N_{BC}$ mentioned previously, may also be indicated along with a preamble subset configuration.

In FIG. 10, a content in a dashed box, namely the number N of subsets (that is, $N_{BC}$ mentioned previously) may be indicated along with the preamble resource pool information, or may be indicated separately in the random access configuration information.

Referring to FIG. 11, the possible preamble index scope in each of the preamble subsets is indicated by indicating an initial preamble index in the each subset and a total number of the preambles.

Besides the two methods illustrated in FIGS. 6-7, the configuration notification manner based on the preamble subset may further comprise: a start index of the first preamble subset and an index of the last sequence in each preamble subset are indicated; or a start index and the number of the each preamble subset are indicated; or the start index of the each preamble subset and the index of the last sequence in each preamble subset are indicated.

Referring to FIG. 12, which is the exemplary view illustrating a further possible manner of the preamble resource configuration by the cover code, wherein all preamble subsets use the same basic sequence pool and different preamble subsets use different cover codes. That is, $N_{BC}$ cover codes and one basic sequence resource pool are defined or preset for the $N_{BC}$ subsets. The nth preamble subset is consist of the basic sequence resource pool and the nth cover code. At this time, the first sequence index in the basic sequence resource pool, a number of sequences in the basic sequence resource pool and an available index scope of the cover code may be indicated when the preamble resource is configured.

If a form of the cover code is predefined, the index scope of the cover code is not required to be indicated and only the number N of subsets (that is, $N_{BC}$ mentioned previously) is needed to be indicated.

FIG. 13 is an exemplary view illustrating a structure of the preamble of FIG. 12 according to the second embodiment of the present disclosure.

Referring to FIG. 13, FIG. 13 illustrates a structure of one of the preamble subsets in FIG. 12. According to FIG. 12, the single preamble subset is generated by the basic sequence resource pool and one corresponding cover code. In the structure shown in FIG. 13, one preamble subset is consist of same or different sequences in the basic sequence resource pool, a cyclic prefix (CP) is added before each sequence, a guard time (GT) is added behind all sequences. The preamble subset consisting of the N sequences may be processed by the cover code $w=[w_1, \ldots, w_N]$ of length N, wherein each elements in the nth sequence is multiplied with the nth element $w_n$ in the cover code ($1 \le n \le N$).

It should be noted that, when the time-frequency resources assigned to the terminals with different beam reciprocity capabilities are distinguished with the preamble, the random access channel time-frequency resources may be configured uniformly, that is, the terminals with different beam reciprocity capabilities may use the same random access channel time-frequency resource. One possible manner may be as follows: the random access channel time-frequency resource is configured so that it can be used by all terminals, and the terminals with the different beam reciprocity capabilities use different preamble subsets.

Another possible manner is to configure a plurality of random access occasions in the random access channel to facilitate the transmission beam scan of the terminal, and the terminals with the different beam reciprocity capabilities may select continuous random access occasions, whose numbers are different, to transmit the preamble.

FIG. 14 is an exemplary flowchart illustrating an interaction between the base station and the terminal according to the second embodiment of the present disclosure. The wireless communication system illustrated in FIG. 14 comprises the terminal 1410 and the base station 1420 communicating with each other.

In order to realize to indicate the beam reciprocity capability by the random access resource implicitly, detailed processes at the terminal are as follows.

Step 1411: the terminal 1410 acquires the random access configuration information including random access resource subset configuration situations corresponding to the different beam reciprocity capabilities, which comprises the random access channel time-frequency resource assigned to the terminals with different beam reciprocity capabilities or the preamble resource pool information assigned to the terminals with different beam reciprocity capabilities.

Step 1413: the terminal 1410 selects a corresponding random access resource according to its beam reciprocity capability, the selected random access resource comprises the random access channel time-frequency resource adapted to the terminal with the beam reciprocity capability or the preamble resource adapted to the terminal with the beam reciprocity capability. The terminal selects usable sequence with equal probability according to the preamble resource information and generates preambles, and transmits the preambles on the random access channels.

Step 1415: the terminal 1410 completes the subsequent processes of random access procedure.

Corresponding to actions at the terminal, in a case that the beam reciprocity capability is indicated by the random access resource implicitly, actions at the base stations are as follows.

Step 1421: the base station 1420 assigns the corresponding random access resources including different random access channel time-frequency resources or different preamble resources to the terminals with different beam reciprocities. In particular, the base station 1420 transmits the random access resource configuration information including random access resource subset configuration situations assigned to terminals with different beam reciprocity capabilities, wherein the random access resource for terminals with different beam reciprocity capabilities comprises one of a random access channel time-frequency resource and preamble resource pool information.

Step 1423: the base station 1420 detects a transmission of the preamble, and determines the random access resource subset corresponding to the beam reciprocity capability, the random access resource subset includes a random access channel time-frequency resource or a preamble resource.

Step 1425: the base station 1420 completes the subsequent processes of random access procedure.

FIG. 15 is an exemplary flowchart where the base station adjusts the random access resource assigned to the terminals with the different beam reciprocity capabilities in real time according to the second embodiment of the present disclosure.

According to the solution of the second embodiment of the present disclosure, in the step 1501, a calculation and adjustment module in the base station may calculate a proportion of the terminals with the beam reciprocity, the terminals with no beam reciprocity and the terminals with the partial beam reciprocity in the current cell, so that a proportion of the random access resource subsets assigned to the terminals with different beam reciprocity capabilities may be adjusted in real time at step 1503.

Particularly, if the terminals with different beam reciprocity capabilities are distinguished by the random access channel time-frequency resources mentioned above, a density of the random access channel time-frequency resources assigned to the terminals with different beam reciprocity capabilities may be adjusted, in order to adjust the proportion of the random access resources assigned to the terminals with different beam reciprocity capabilities. For example, a density in a time domain of the random access channel time-frequency resource subsets is adjusted, such as an occurrence times of the random access channel time-frequency resource subsets assigned to the terminals with different beam reciprocity capabilities in one subframe. Such kind of parameter may be indicated by random access channel configuration parameters, that is, the different random access channel time-frequency resource subsets have different random channel configuration parameters.

If the terminals with different beam reciprocity capabilities are distinguished by the preamble, a number of the preambles included in the different preamble resource subsets may be adjusted. Such kind of parameter may be adjusted by changing the number of the preambles in the preamble subsets.

At step 1505, a notification module in the base station indicates the random access resource subsets to the terminals with different beam reciprocity capabilities.

For the above processes, the base station can calculate the proportion of the terminals with different beam reciprocity capabilities among accessed terminals in a periodic manner, and decide whether the random access resources are required to be adjusted. The adjustment of the random access resources would result in changes in the system information carrying the random access configuration information, therefore a system information changing process may be trigged. If the terminal is in a connection state, a new system information is acquired according to a system information change indication. If the terminals is in a non-connection state (for example, an idle state), the random access configuration information is acquired before every random access attempt.

FIG. 16 is an exemplary view illustrating an apparatus for determining the random access resource of the terminal according to the second embodiment of the present disclosure.

The apparatus for determining a random access resource by the terminal according to the second embodiment of the present disclosure comprises: a configuration information acquisition module 1601 configured to acquire the random access resource configuration information including the random access resource (the time-frequency resource or the preamble resource) assigned to the terminals with different beam reciprocity capabilities via the main information block in the broadcast channel or the SIB indicated by the main information block, particularly the random access configuration information comprises random access resource subset configuration situations corresponding to the different beam reciprocity capabilities, which includes the random access channel time-frequency resource assigned to the terminals with different beam reciprocity capabilities or the preamble resource pool information assigned to the terminals with different beam reciprocity capabilities; a random access resource selection module 1603 configured to select a corresponding random access resource (the time-frequency resource or the preamble resource) according to its beam reciprocity capability; and a preamble transmission module 1605 configured to generate the preamble according to the selected random access resource, and transmit the preamble on the corresponding time-frequency resource.

FIG. 17 is an exemplary view illustrating an apparatus for assigning the random access resource of the base station according to the second embodiment of the present disclosure. The apparatus for assigning a random access resource by the base station comprises: a random access resource configuration information transmission module 1701 configured to transmit a random access resource configuration information including random access resource subset configuration situations assigned to terminals with different beam reciprocity capabilities, wherein the random access resource for terminals with different beam reciprocity capabilities comprises one of the random access channel time-frequency resource and the preamble resource pool information; and a preamble detection module 1703 configured to detect a transmission of a preamble, and determine the random access resource corresponding to the beam reciprocity capability.

FIG. 18 is an exemplary view illustrating an apparatus for assigning the random access resource of the base station according to the second embodiment of the present disclosure.

The apparatus for assigning the random access resource by the base station according to the second embodiment of the present disclosure comprises: a beam reciprocity capability calculation module 1801 configured to calculate a proportion of the accessed terminals with various beam reciprocity capabilities; a random access resource assignment adjusting module 1803 configured to adjust the random access resource (the time-frequency resource or the preamble resource) assigned to the terminals with different beam reciprocity capabilities according to the proportion of the terminals with the various beam reciprocity capabilities acquired by the calculation module, particularly, to adjust the random access resource configuration information, the random access resource configuration information includes random access resource subset configuration situations corresponding to the different beam reciprocity capabilities, and one of the random access channel time-frequency resource assigned to the terminals with different beam reciprocity capabilities and the preamble resource pool information assigned to the terminals with different beam reciprocity capabilities; and a resource configuration information notification module 1805 configured to indicate the adjusted random access resource configuration information to the terminals via the main information block in the broadcast channel or the System Information Block SIB indicated by the main information block.

The present disclosure provides a scheme for indicating the beam reciprocity capability of the terminal, and the terminal can report the beam reciprocity capability of this terminal when the access is completed by transmitting the message 3 or selecting the random access resource in the process of random access procedure, so that the base station can acquire the beam reciprocity capability information of the terminal as early as possible. After acquiring the beam reciprocity capability information, the base station can manage subsequent processes such as scheduling, resource assignment, beam management, beam correction and the like more efficiently. With the method according to the present disclosure, the operation efficiency of the system can be increased, and the processes such as resource assignment, beam management, beam correction and the like can be more efficient.

Embodiment 3

FIG. 21 illustrates a third embodiment of contention-free random access process according to the inventive concept of the present application. It is only an example and not intended to limit the scope of the disclosure as claimed.

In a scenario of the third embodiment, the base station has transmitted the downlink data to the terminal, and needs to receive the feedback from the terminal for the downlink data. In this case, although the terminal is in connection, the uplink synchronization has not been completed yet. At this time, the base station triggers the contention-free random access process by the signaling in the downlink control channel and configures the random access channel time-frequency resources and the random access preamble used for the contention-free random access process.

As shown in FIG. 21, in the third embodiment, the contention-free random access process includes the following steps.

In S2110, the terminal receives the configuration information for the contention-free random access process. The terminal may obtain the configuration information of the contention-free access process by monitoring the downlink control channel and receiving the downlink control information therefrom. Wherein, the configuration information includes an index of the random access channel, an index of the preamble, and the like. The index of random access channel herein is used to configure the random access channel time-frequency resource, and the index of the preamble is used to configure the preamble.

In S2120, the terminal transmits the configured preamble in the configured random access channel. In this step, after receiving the downlink control information of the contention-free random access process, the terminal obtains the configuration information of the contention-free random access process and determines the time-frequency resources of the random access channel and the preamble, and transmits the preamble over the corresponding time-frequency resources.

In step S2130, the terminal detects and receives a random access response in a downlink control channel, and determines whether a contention-free random access process is successful based on the random access response.

In S2130, the detecting and receiving the random access response may be performed in following schemes.

In the first scheme, the terminal detects the random access response within a random access response window starting from the k-th sub-frame pre-determined or configured after the transmission of preamble. The terminal detects the downlink control information within the downlink control channel of a subframe in the random access response window, and if the cyclic redundancy check (CRC) of the downlink control information is scrambled by the RA-RNTI which matches the random access time-frequency resource of the transmission of preamble, the terminal continues to detect and decode the corresponding control information. The downlink control information includes at least a preamble identifier and a timing advance indication. The timing advance indication is used to indicate a Timing Advance (TA) required to be maintained by the terminal device to ensure that the uplink data transmitted by the terminal can reach the base station synchronously.

Herein, there may be two different schemes to determine whether the contention-free random access process is successful.

In the first scheme, a determination is made by using a preamble identifier in the downlink control information. If the preamble identifier matches the preamble transmitted by the terminal, the contention-free random access process is determined to be successful. Thereafter, the downlink control information is acquired and additionally, the timing advance indication in the downlink control information is detected.

In the second scheme, with respect to whether it is a contention-free random access process or not, based on the original content in the downlink control information, an indication of random access response may be added to distinguish the different cases. If the indication of random access response is a pre-determined value (e.g., 1), it indicates that the downlink control information is used to transmit information for contention-free random access; otherwise, it indicates downlink control information used for transmitting other information.

With the addition of the indication, the terminal performs the contention-free random access process as follows.

In step (a), the terminal detects the downlink control information within the downlink control channel of subframes in the random access response window. If the CRC code of the downlink control information is scrambled by the Random Access Radio Network Temporary Identifier (RA-RNTI) which matches the random access time-frequency resource of the transmission of preamble, the terminal continues to acquire the corresponding downlink control information.

In step (b), if the indication of random access response in the downlink control information is a pre-determined value, other contents in the downlink control information are further detected. If it is detected that the preamble identifier matches the preamble, it is determined that the contention-free random access has been successfully performed and the downlink control information is acquired, and additionally, the timing advance indication in the downlink control information is detected.

In step (c), if the indication of random access response in the downlink control information is 0 or the pre-determined value, but the preamble identifier in the downlink control information does not match the preamble, the terminal continues to detect other sub-frames in the random access response window. If the downlink control information satisfying the conditions above is not detected in the random access response window, it is determined that the contention-free random access process has failed.

In the scheme, in addition to the information above, the downlink control information may additionally carry an uplink grant, so that the terminal may start to transmit the uplink data after completing the contention-free random access process.

In step S2130, the second approach for the terminal to detect and receive the random access response is as follows.

The terminal detects the random access response in the random access response window starting from the k-th sub-frame after transmitting the preamble. The terminal detects the downlink control information within the downlink control channel of a subframe in the random access response window. If the CRC of the downlink control information is scrambled by using a Cell Radio Network Temporary Identifier (C-RNTI), the terminal continues to acquire the corresponding downlink control information. The downlink control information includes at least a preamble identifier and a timing advance indication.

Herein, similarly to the first approach, there are also two different schemes to determine whether the contention-free random access process is successful.

In the first scheme, if the preamble identifier matching the transmitted preamble identifier is detected in the downlink control information, the contention-free random access process is determined to be successful and the downlink control information is acquired.

In the second scheme, similarly to the previous discussion, an indication of random access response may be added to the corresponding downlink control information. When the indication is a pre-determined value (e.g., 1), it indicates that the downlink control information is used for transmitting the information of contention-free random access, otherwise it indicates that the downlink control information is used for transmitting other types of downlink control information. In this case, the downlink control information may not include the preamble identifier. If the downlink control information scrambled by using the C-RNTI is detected, and the indication of random access response therein is the pre-determined value, the contention-free random access process may be determined to be successful and the downlink control information is acquired.

By applying the C-RNTI scrambling to the CRC in the downlink control information, the random access is indicated by transmitting less information, since it is determined whether the downlink control information is used for random access by determining whether the indication of random access response is a pre-determined value (e.g., 1). Therefore, as the base station in connection can acquire the information of the terminal, the process of receiving the random access response may be simplified, thereby the delay of the contention-free random access process is reduced and the system performance is improved.

In this case, if 1) the terminal detects the downlink control information scrambled by the C-RNTI, or 2) the terminal detects the C-RNTI scrambling but the preamble identifier in the downlink control information does not match the transmitted preamble identifier, or 3) the terminal detects the C-RNTI scrambling but the indication of random access response in the downlink control information is not the pre-determined value, it is determined that the contention-free random access process has failed.

In step S2130, the third approach for the terminal to detect and receive the random access response is as follows.

The terminal detects the random access response in the random access response window starting from the k-th sub-frame after transmitting the preamble. The terminal detects the downlink control information within the downlink control channel of a subframe in the random access response window. If the CRC of the downlink control information is scrambled by the Random Access Preamble-Radio Network Temporary Identity (RA-P-RNTI) of the terminal, the terminal continues to acquire the corresponding downlink control information. The RA-P-RNTI is an RNTI calculated according to the random access channel time-frequency resource index and the preamble index. One approach for calculating the RA-P-RNTI is that the last ten bits of the RA-P-RNTI may be calculated based on the index of the time-frequency resource of the channel. For example, the equation may be as follows:

$$[RA\text{-}P\text{-}RNTI]_{10} = +t_d + 10 f_d.$$

In the equation, $[RA\text{-}P\text{-}RNTI]_{10}$ represents the last ten bits of the RA-P-RNTI, $f_d$ represents the index of the frequency domain of the random access channel, and $t_d$ represents the index of the time domain of the random access channel. The highest six bits of the RA-P-RNTI use a random access preamble index.

Another approach for calculating the RA-P-RNTI may be as follows:

$$RA\text{-}P\text{-}RNTI = 1 + t_d + 10 f_d + 60\ I_p.$$

In the equation, $I_p$ is the preamble index.

If the terminal detects the downlink control information scrambled by the RA-P-RNTI that matches both the time-frequency resource of the random access channel and the preamble in the random access response window, the terminal determines that the contention-free random access process is successful and further acquires the downlink control information. In this case, the downlink control information includes a timing advance indication, according to which the terminal adjusts the timing advance, and performs uplink synchronization and subsequent data transmission.

In the third scheme, besides the timing advance indication, the downlink control information may include a preamble identifier and an uplink grant. The preamble identifier is used to determine the preamble, and the uplink grant is used by the terminal to send the uplink data.

If the terminal does not detect the downlink control information scrambled by the RA-P-RNTI that matches both the time-frequency resource of the random access channel and the preamble in the random access response window, the contention-free random access process is determined to have failed.

In the schemes above of the third embodiment, if the contention-free random access process fails, the power is boosted according to the random access process configuration information, and the time-frequency resource of the random access channel and preamble are reused to attempt random access process. The procedure is repeated until the contention-free random access process succeeds.

Embodiment 4

FIG. 22 illustrates the Fourth embodiment of the present application. It is only an example and not intended to limit the scope of the disclosure as claimed.

In the Fourth embodiment, a contention-free random access process is proposed in combination with a particular system. In the process of handover, the contention-free random access process is triggered by higher-layer signaling. In this case, the switching instruction configured in the high-level signaling will include a configuration instruction of the contention-free random access process, which includes a random access channel time-frequency indication and a preamble indication.

As illustrated in FIG. 22, the contention-free random access process in the fourth embodiment includes the following steps.

In S2210, the terminal receives the configuration information for the contention-free random access process through a higher layer instruction.

In S2220, the terminal transmits the configured preamble in the configured random access channel.

In S2230, the terminal detects and receives a random access response, and acquires a timing advance indication and initial uplink grant.

In S2230, the terminal may detect and receive the random access response by the following schemes.

In the first scheme of detecting and receiving the random access response, the CRC of the corresponding downlink control information is scrambled by the RA-RNTI corresponding to the random access channel time-frequency resource. The downlink control information includes a preamble identifier, a timing advance indication, an initial uplink grant, and the like. In this case, the downlink control information is used to determine the contention-free random access process corresponding to the downlink control information. The timing advance indication is used by the terminal to modify the timing advance. The initial uplink grant includes the indication of the position of the time-frequency for the terminal to transmit uplink data for the first time, so that the terminal may try to transmit the uplink data after accessing a new base station.

In the fourth embodiment, there may also be two different schemes to determine whether the contention-free random access process is successful.

In the first scheme, the terminal performs the following steps:

After transmitting the preamble, the terminal detects the random access response in the random access response window starting from the k-th sub-frame. If it is detected that the CRC of the downlink control information is scrambled by the RA-RNTI matching with the time-frequency resource of the random access channel, the downlink control information is further detected. If the preamble identifier in the downlink control information matches the transmitted preamble, it is determined that the contention-free random access process succeeds, the timing advance indication and the initial uplink grant in the downlink control information are acquired, and the timing advance is adjusted accordingly. Subsequently, the uplink data is transmitted in the uplink time-frequency resource indicated by the uplink grant.

In the second scheme, similarly to the third embodiment, in order to distinguish the downlink control information for the random access process from other downlink control information, random access indication may be added to the downlink control information. If the indication is a pre-determined value (e.g., 1), it is indicated that the downlink control information is used for a random access process.

If the random access indication is added to the downlink control information, the terminal performs the following steps:

If the terminal detects that the CRC of the downlink control information is scrambled by the RA-RNTI that matches the time-frequency resource of the random access channel, the terminal further detects the downlink control information. If the random access indication in the downlink control information is the pre-determined value and the preamble identifier matches the transmitted preamble, it is determined that the contention-free random access process is successful, and the terminal acquires the timing advance indication and initial uplink grant in the downlink control information, and adjust the timing advance accordingly. After that, the terminal transmits the uplink data over the uplink time-frequency resource indicated by the uplink grant.

In the second scheme of detecting and receiving a random access response, in the cell instruction, a C-RNTI which the target cell base station assigns to the terminal is carried. Therefore, when the contention-free random access process is performed in the target cell, the CRC of the downlink control information used to indicate the random access response may be scrambled by the corresponding C-RNTI. In this case, the downlink control information scrambled by the C-RNTI may be regarded as the primary downlink control information of the terminal unambiguously. By scrambling the CRC of the downlink control information using the C-RNTI, it is determined whether the downlink control information is used for random access only by determining whether the indication of random access response information is a predetermined value (e.g., 1), so that the random access may be indicated by less information transmission. Therefore, by using the convenient condition that the base station can learn the terminal information in the connected state, the procedure of receiving the random access response may be simplified, so as to reduce the access delay and improve the system performance in the contention-free random access process.

In this case, in the corresponding downlink control information, at least a timing advance indication and an initial uplink grant command should be included. The timing advance indication is used to indicate a timing advance required by the terminal to complete the uplink synchronization. The initial uplink grant command includes an uplink time-frequency resource allocation command allocated to the terminal for initial uplink data transmission.

In the second scheme, the terminal performs the following steps:

After transmitting the preamble, the terminal detects the random access response in the random access response window starting from the k-th sub-frame. If it is detected that the CRC of the downlink control information is scrambled by the C-RNTI allocated by the target base station in the handover command and the downlink control information can be decoded successfully, it is determined that the contention-free random access process is successful, and the terminal acquires the downlink Control information to obtain the timing advance instruction to complete uplink synchronization. The terminal prepares to transmit uplink data after obtaining the initial uplink grant.

In the steps described above, if the terminal does not detect the downlink control information scrambled by the C-RNTI in the random access response window, it is determined that the contention-free random access process fails.

In the second scheme, in the downlink control information scrambled by C-RNTI, a preamble identifier and/or a random access process indication may also be added. Wherein, the preamble identifier is used by the terminal to determine that the downlink control information is a response of the initiated random access process, and the random access process indication is used to distinguish the downlink control information for the random access process from other downlink control information.

If the preamble identifier and/or the random access process indication are added to the downlink control information, the terminal performs the following steps:

If the terminal detects the CRC of the downlink control information scrambled by C-RNTI allocated by the target base station in the handover command, the terminal continues to detect the downlink control information. If the downlink control information includes random access indication, the indication information is a pre-determined value (e.g., 1), and the corresponding preamble identifier matches the transmitted downlink control information, it is determined that the random access process is successful, and the terminal acquires the downlink control information.

In the step above, if 1) the terminal does not detect the downlink control information with the CRC scrambled by C-RNTI in the random access response window, or 2) detects the downlink control information with the CRC scrambled by C-RNTI but the preamble identifier in the corresponding downlink control information does not match the transmitted preamble identifier, or 3) the random access indication is not the pre-determined value, or 4) the random access indication is the pre-determined value but the preamble identifier for random access does not match the transmitted preamble, it is determined that the contention-free random access process fails.

In the third scheme, similarly to the first embodiment, a new RA-P-RNTI is designed and used to scramble the CRC of the downlink control information. The value of the RA-P-RNTI is determined by the time-frequency resources of the random access channel and the preamble index. The way to calculate the RA-P-RNTI is the same as that in the first embodiment, and will not be repeated herein.

If RA-P-RNTI scrambling is used, the terminal may determine by RA-P-RNTI whether the downlink control information is initiated by the terminal. Therefore, the corresponding downlink control information should include at least the timing advance indication and the initial uplink grant.

If the terminal detects the downlink control information scrambled by the RA-P-RNTI that matches the time-frequency resource of the random access channel and the preamble in the random access response window, it is determined that the contention-free random access process is successful, and the timing advance instruction is performed to complete the uplink synchronization. Subsequently, the terminal acquires the initial uplink grant and prepares to be transmit the uplink data.

If the terminal does not detect the RA-P-RNTI matching the time-frequency resources of the random access channel and the preamble in the random access response window, it is determined that the contention-free random access process fails.

In the three schemes for detecting and receiving the random access response, if it is determined that the contention-free random access process fails, the power is ramped and the random access process is re-attempted using the configured time-frequency resources of the random access channel and preambles. The procedure is repeated until the contention-free random access process is completed successfully.

Embodiment 5

In the fifth embodiment, there is provided a contention-free random access process in combination with a particular system. In the embodiment, the steps of the contention-free random access are as follows.

In the embodiment, the terminal initiating the contention-free random access is enabled to detect the downlink control channel by RA-RNTI and C-RNTI while detecting in a random access response window. The base station may configure the terminal how to detect the downlink control channel in the random access response window. The details are as follows.

The terminal receives the configuration information of the contention-free random access from a base station, which includes the configuration information of the random access channel and the preamble configuration information for contention-free random access, and indication for selecting the approach for detecting in the random access response window;

The terminal transmits the preamble configured by the base station in the random access channel configured by the base station according to the configuration information of the contention-free random access;

After transmitting the preamble, the terminal uses the approach for detecting configured by the base station to detect the random access response in the random access response window after the timing which is fixed or configured by the base station.

The steps above will be described in details below.

In the configuration information for contention-free random access configured by the base station, the indication for indicating the approach for detecting is to: 1) indicate that the RA-RNTI is used to detect the downlink control channel in the random access response window, or 2) the C-RNTI is used to detect the downlink control channel in the random access response window. For example, 1-bit indication is used to indicate the approach for detecting. That is, the RA-RNTI is used to detect the downlink control channel by default, and the C-RNTI may be used to detect the downlink control channel optionally. The 1-bit indication is used to indicate whether to use the C-RNTI to detect the downlink control channel.

After transmitting the preamble, the terminal detects the downlink control channel in the random access response window after the timing that is fixed or configured by the base station. If the indication for indicating the approach for detecting indicates that RA-RNTI is used for detecting, the RA-RNTI is calculated according to the time-frequency resource of the random access channel of the transmission of preamble. If the downlink control information scrambled is detected by the RA-RNTI, and the downlink control information is decoded successfully, the terminal continues to detect the content of the downlink control information. If the downlink control information includes a preamble identifier matching the transmitted preamble, it is determined that the contention-free random access is successful.

If the indication for indicating the approach for detecting indicates that C-RNTI is used for detecting, the terminal detects the downlink control channel according to the C-RNTI. If the downlink control information scrambled by the C-RNTI is detected and the downlink control information is successfully decoded, it is determined that contention-free random access is successful. If the downlink control information is decoded successfully and the downlink control information includes the preamble identifier matching the transmitted preamble, it is determined that the contention-free random access is successful.

In other approaches, the base station does not configure the approach for detecting, and the terminal detects the downlink control channel by using both the RA-RNTI and the C-RNTI. That is, the terminal calculates the RA-RNTI according to the time-frequency resource of the random access channel for transmitting the preamble, and detects the downlink control channel by using the RA-RNTI and the C-RNTI. If downlink control information scrambled by RA-RNTI or C-RNTI is detected and the downlink control information is successfully decoded, the possible subsequent operations may be as follows:

a. If the downlink control information includes a preamble identifier matching the transmitted preamble, it is determined that the contention-free random access is successful;

b. If the downlink control information scrambled by C-RNTI is detected and successfully decoded, it is determined that the contention-free random access is successful; if downlink control information scrambled by RA-RNTI is detected and successfully decoded, and the preamble identifier thereof matches the transmitted preamble, it is determined that the contention-free random access is successful.

In the approaches above, if the contention-free random access succeeds, the terminal continues to acquire the timing advance information and the uplink grant from the downlink control information.

FIG. 23 shows a block diagram of a device for contention-free random access according to some embodiments of the present disclosure. This figure is merely an example and is not intended to limit the scope of the disclosure as claimed.

As shown in FIG. 23, the device for contention-free random access includes: receiving module, configured to receive configuration information for a contention-free random access process; configuration module, configured to, based on the received configuration information, transmit the configured preamble in the configured random access channel; detecting module, configured to detect and receive a random access response in a downlink control channel; and a determining module, configured to determine, based on the random access response, whether the contention-free random Access process is successful.

Embodiment 6

In the present embodiment, a manner for uplink power allocation will be discussed in connection with a specific system. Both of uplink and downlink transmissions of the system adopt CP-OFDM as a transmission waveform, and adopt a same demodulation reference signal structure. It is taken into account that, when the CP-OFDM is adopted as a reference waveform of the uplink transmission, a demodulation reference signal mode, which is discrete in both a time domain and a frequency domain, is able to provide a tradeoff between an estimation accuracy in a time domain channel and an estimation accuracy in a frequency domain channel. Therefore, in the present embodiment, a reference signal structure as illustrated in FIG. 24A is adopted.

FIG. 24A is a schematic diagram illustrating a structure of a reference signal according to one embodiment of the present disclosure.

As illustrated in FIG. 24A, a physical resource block (PRB) consists of 12 continuous sub-carriers on 14 symbols, and it is assumed that the first two symbols are used to transmit control channels, and the remaining symbols are used to transmit data channels. In data channels, reference signals are inserted in a manner in which time domain discretion and frequency domain discretion are both satisfied. The reference signal may be used for demodulating of the data signals, such as a demodulation reference signal (DMRS), or may be a reference signal for an uplink physical channel estimation. It should be noted that, the reference signal structure illustrated in FIG. 24A is just a schematic diagram for a possible situation, however, a different reference signal structure having another structure can also be adopted. For example, for a terminal with multiple antennas and capable of transmitting data over multiple antenna ports, mutually orthogonal uplink reference signals can be provided for the multiple antenna ports in a way in which the above-described structure is combined with a Code Division Multiplexing (CDM).

FIG. 24B is a schematic diagram illustrating a wireless frame according to an embodiment of the present disclosure.

In the description of the present disclosure, a wireless frame consists of a plurality of subframes each including a plurality of slots, and each slot consists of a plurality of symbols. A plurality of consecutive sub-carriers of the plurality of symbols on each slot constitute a Resource Block (RB) in frequency domain, one sub-carrier on the each symbol is called as a Resource Element (RE). That is to say, one RB consists of a plurality of REs.

A simple example is illustrated in FIG. 24B. Referring to FIG. 24B, a wireless frame comprises 10 subframes, each subframe comprises two slots, each slot comprises 7 symbols, and 12 consecutive sub-carriers over the slot constitutes one RB.

By using the scheme provided in the present disclosure, a power control manner at the terminal side would be described through the flowchart description illustrated in FIG. 25.

FIG. 25 is a flowchart illustrating a method for uplink power control according to one embodiment of the present disclosure, which comprises the steps as follows:

Step 2510: the terminal reads a power control parameter and a power adjustment parameter;

Step 2520: calculating an average transmission power of data resource elements (REs) (i.e., the REs carrying data channels) and an average transmission power of reference signal REs (i.e., the REs carrying reference signals) according to the power control parameter, the power adjustment parameter and a channel measurement result, and further determining a transmission power of symbols bearing the reference signals and a transmission power of symbols not bearing the reference signals; and Step 2530: adjusting the transmission power of symbols bearing the reference signals and the transmission power of symbols bearing no reference signals.

Referring to FIG. 25, in step 2510, the power control parameter includes a TPC command, and the power adjustment parameter includes a ratio of the average transmission power of the reference signal REs to that of the data REs.

A possible parameter setting manner of the power control parameter and the power adjustment parameter is: these two parameters are configured and transmitted independently. That is, the TPC command and the ratio of the average transmission power of the reference signal REs to that of the data REs are set respectively, and are configured by different configuration index tables. For example, the TPC command may be configured and notified in a manner of index table, by referring to a manner set in LTE. The TPC command may be a power change value. Table 2 shows an example of configuration index table of the power control parameter.

TABLE 2

Configuration index table of power control parameter

| index | power control parameter(dB) |
|---|---|
| 0 | −3 |
| 1 | 0 |
| 2 | 3 |
| 3 | 6 |
| ... | ... |

Meanwhile, the ratio of the average transmission power of the reference signal REs to that of the data REs is configured and notified in the manner of index table as well. Table 3 shows an example of a configuration index table of the ratio of the average transmission power of the reference signal REs to that of the data REs.

TABLE 3

Configuration index table of Ratio of average transmission power of reference signal REs to that of data Res

| index | ratio of average transmission power of reference signal REs to that of data REs |
|---|---|
| 0 | parameter 1 |
| 1 | parameter 2 |
| 2 | parameter 3 |
| 3 | parameter 4 |
| 4 | parameter 5 |
| ... | ... |

In table 3, the parameters may be described in different ways. For example, one possible way is to describe with a single parameter. In the table, a unit of the ratio of the power of the reference signal RE to the power of the data RE is dB, and a possible value thereof is a rational number around 0.

With the above-mentioned way, the terminal reads the index of the TPC command and the index of the ratio of the average transmission power of the reference signal REs to that of the data REs respectively, so that the detailed configuration parameters are acquired for configuring the uplink transmission power of the terminal.

Another possible way for setting the parameters is to transmit the TPC command and the ratio of the average transmission power of the reference signal REs to that of the data REs simultaneously, and use a same index table to configure and notify said configuration. An example of index table as this joint configuration manner is adopted is shown in table 4.

TABLE 4 index table of jointly configuring manner

| index | power control parameter (dB) | ratio of average transmission power of reference signal REs to that of data REs |
|---|---|---|
| 0 | −3 | parameter 1 |
| 1 | | parameter 2 |

TABLE 4-continued index table of jointly configuring manner

| index | power control parameter (dB) | ratio of average transmission power of reference signal REs to that of data REs |
|---|---|---|
| 2 | 0 | parameter 3 |
| 3 | | parameter 4 |
| 4 | 3 | parameter 5 |
| 5 | | parameter 6 |
| ... | ... | ... |

In the example shown in Table 4, the same power control parameter corresponds to a plurality of ratios of the average transmission power of the reference signal REs to that of the data REs. The plurality of ratios of the average transmission power of the reference signal REs to that of the data REs, which correspond to the different power control parameters (TPC commands), may be same, different, or partially same or different. Despite the example shown in Table 4, another configuration manner is as follows: the same ratio of the average transmission power of the reference signal REs to that of the data REs corresponds to a plurality of power control parameters, while the plurality of power control parameters corresponding to the different ratios of the average transmission power of the reference signal REs to that of the data REs may be same, different, or partially same or different.

With the manner shown in Table 4, the terminal reads the index of power control configuration, and acquires the detailed power control parameter (TPC command) and the ratio of the average transmission power of the reference signal REs to that of the data REs according to the index table in Table 4.

In addition to the notification manner based on the index table, the ratio of the average transmission power of the reference signal REs to that of the data REs may be directly quantized, and the quantized ratio is notified and configured.

The terminal reads the power control parameter and the power adjustment parameter in the downlink control channel or a higher signalling. If the power control parameter is transmitted in the downlink control channel, a new field is added to a downlink control information (DCI) to transmit the power adjustment parameter (the ratio of the average transmission power of the reference signal REs to that of the data REs); or an existing field for the TPC command in the original DCI is expanded and a number of bits allocated to the TPC command is increased, so that the new TPC command may indicate and configure the power control parameter and the power adjustment parameter simultaneously.

Another way of configuring and reading the power control parameter and the power adjustment parameter is transmitting one part of the parameters in the downlink control channel and configuring the other part of the parameters through the higher signalling. For example, a possible way is that, similarly to LTE, the power control parameter is transmitted by using the downlink control channel, and the newly added power adjustment parameter (the ratio of the average transmission power of the reference signal REs to that of the data REs) may be configured and notified through a configuration manner via the higher signalling. With this way, the terminal reads the power adjustment parameter from the higher signalling and reads the power control parameter from the control channel, for uplink power control.

It should be noted that, both the TPC command (the power control parameter) and the ratio of the average transmission power of the reference signal REs to that of the data REs (the power adjustment parameter) are terminal specific signallings. That is, for different terminals, contents indicated may be different. Meanwhile, the indicated content is determined by the base station on the basis of a power allocation situation and a channel condition of the terminal.

FIG. 26 is a flowchart illustrating in detail the specific flow of step 2520 of FIG. 25, according to one embodiment of the present disclosure.

Referring to FIG. 26, according to one embodiment of the present disclosure, the determining of the average transmission powers of the data REs and the reference signal REs of the uplink and in turn determining the transmission power of symbol in step 2520 are as follows:

Step 2610: calculating the average transmission power of the REs according to the channel measurement result and the read power control parameter (the TPC command);

Step 2620: determining the average transmission power of the data REs as the average transmission power of the REs;

Step 2630: determining the average transmission power of the reference signal REs, according to the average transmission power of the data REs, and the ratio of the average transmission power of the reference signal REs to that of the data REs;

Step 2640: calculating an uplink transmission power of symbols bearing the reference signals (i.e., symbols containing the reference signal REs) and an uplink transmission power of symbols bearing no reference signals (i.e., symbols not containing the reference signal REs), according to the reference signal structure (for example, a number of the reference signal REs and a number of the data REs, etc).

In the above steps, for step 2610, the average transmission power $P_{base}$ of the REs may be calculated according to an equation (1) below:

$$P_{base} = P_0 + \alpha \cdot PL + \Delta_{TF} + f(\Delta_{TPC}) \quad (1)$$

However, this is merely an example, and the calculation method of the average transmission power $P_{base}$ of REs is not limited thereto.

Wherein, parameter $P_0$ is a base power of REs configured by the base station; parameter PL is a pathloss measured by the terminal, parameter a is a compensation factor of the pathloss, which is configured and notified by the base station via the higher signalling; parameter $\Delta_{TF}$ is a power adjustment quantity calculated by the terminal according to the Modulation and Coding Scheme (MCS) adopted in the uplink data transmission; and parameter $f(\Delta_{TPC})$ is a dynamic power adjustment parameter calculated by the terminal according to the power control parameter (TPC command) configured by the base station, and its calculation approach may be determined by referring to a calculation approach of dynamic power adjustment parameter in LTE.

It should be noted that, all powers in the equation (1) are average powers per RE, instead of average powers per symbol. Additionally, the power may be an actual value, and may also be expressed in a unit of dBm.

In step 2620, the terminal determines the average transmission power $P_{data}$ of the data REs according to the average transmission power of the REs calculated in step 2610.

$$P_{data} = P_{base} \quad (2)$$

In step 2630, the terminal determines the average transmission power of the reference signal REs, according to the average transmission power of the data REs acquired in step 2620, and the received ratio of the average transmission power of the reference signal REs to that of the data REs.

Specifically, the ratio of the average transmission power of the reference signal REs to that of the data REs is expressed as a parameter $\Delta_{RS\_data}$. If a unit of the calculation result of the equation (2) is dBm, then a unit of the parameter $\Delta_{RS\_data}$ is dB, and the average transmission power of the reference signal REs $P_{RS}$ is calculated as follows:

$$P_{RS} = P_{data} + \Delta_{RS\_data} \quad (3)$$

If the calculation result of the equation (2) is an actual value of the power, then the ratio of the average transmission power of the reference signal REs to that of the data REs is an actual ratio, and the average transmission power of the reference signal REs $P_{RS}$ is calculated as follows:

$$P_{RS} = P_{data} \Delta_{RS\_data} \quad (4)$$

Another possible situation is that, the ratio of the average transmission power of the reference signal REs to that of the data REs is the actual ratio, but the unit of the calculation result of the equation (2) is dBm, then the average transmission power of the reference signal REs $P_{RS}$ is calculated as follows:

$$P_{RS} = P_{data} + 10 \log_{10} \Delta_{RS\_data} \quad (5)$$

In step 2640, the terminal calculates the transmission power of symbols bearing the reference signals and the transmission power of symbols bearing no reference signals respectively, in accordance with the average transmission power $P_{data}$ of the data REs and the average transmission power $P_{RS}$ of the reference signal REs calculated in steps 2620 and 2630.

According to the resource allocation situation and the adopted reference signal structure, the terminal may acquire the total number $M_{all}$ of REs on each symbol allocated to the terminal, and the number $M_{data}$ of the data REs on the symbols bearing the reference signal and the number $M_{RS}$ of the reference signal REs. The terminal may determine the transmission power $P_{RS}^A$ of the symbols bearing the reference signals, and the transmission power $P_{data}^A$, of symbols bearing no reference signals in accordance with the aforementioned parameters.

In details, if the average transmission power of the data REs and the average transmission power of the reference signal REs are both in unit of dBm, the total power $P_{RS}^{A\_RS}$ of the reference signal REs on symbols bearing the reference signals is shown as an equation (6):

$$P_{RS}^{A\_RS} = P_{RS} + 10 \log_{10} M_{RS} \quad (6)$$

Additionally, the total power $P_{RS}^{A\_data}$ of the data REs on symbols bearing the reference signals is shown in an equation (7):

$$P_{RS}^{A\_data} = P_{data} + 10 \log_{10} M_{data} \quad (7)$$

The transmission power $P_{RS}^A$ of symbols bearing the reference signals may be acquired according to the calculated $P_{RS}^{A\_RS}$ and $P_{RS}^{A\_data}$.

Further, the transmission power of symbols bearing no reference signals may be shown in an equation (8):

$$P_{data}^A = P_{data} + 10 \log_{10} M_{all} \quad (8)$$

If the average transmission power $P_{data}$ of the data REs and the average transmission power $P_{RS}$ of the reference signal REs acquired in step 330 are the actual power values, the transmission power $P_{RS}^A$ of symbols bearing the reference signals and the transmission power $P_{data}^A$ of symbols bearing no reference signals may be calculated according to equations (9) and (10):

$$P_{RS}^A = M_{RS} P_{RS} + M_{data} P_{data} \qquad (9)$$

$$P_{data}^A = M_{all} P_{data} \qquad (10)$$

Continuing referring to FIG. 25, in step 2530, the terminal calculates a final transmission power of symbols of the terminal, according to the transmission power $P_{RS}^A$ of symbols bearing the reference signals, the transmission power $P_{data}^A$ of symbols bearing no reference signals, and the maximum transmission power $P_{MAX}$ of the terminal ac acquired in step 2220. Depending on a relationship between $P_{RS}^A$ and $P_{data}^A$ is higher, there are 3 cases to be discussed.

Case 1

If $P_{RS}^A > P_{data}^A$, that is, the ratio of the average transmission power of the reference signal REs to that of the data REs is greater than 1 or greater than 0 dB, the transmission power $P_1$ of symbols bearing the reference signals is as shown in an equation (11):

$$P_1 = \max\{P_{MAX}, P_{RS}^A\} \qquad (11)$$

If $P_{MAX} < P_{RS}^A$, it means that the transmission power of the symbols bearing the reference signals exceeds the maximum transmission power allowable by the terminal. To keep the average transmission power of the data REs unchanged, it is needed to scale down the transmission power of the symbols bearing no reference signals. After being scaled down, the transmission power $P_2$ of symbols bearing no reference signals is as shown in an equation (12):

$$P_2 = P_{data}^A - \max\{0, P_{RS}^A - P_{MAX}\} \qquad (12)$$

It should be noted that, each parameter in the equations (11) and (12) is in unit of dBm, and it is applicable to the case where $P_{MAX} < P_{RS}^A$ or $P_{MAX} \geq P_{RS}^A$.

Case 2

If $P_{RS}^A < P_{data}^A$, that is, the ratio of the average transmission power of the reference signal REs to that of the data REs is smaller than 1 or smaller than 0 dB, the transmission power $P_2$ of symbols bearing no reference signals is as shown in an equation (13):

$$P_2 = \max\{P_{MAX}, P_{data}^A\} \qquad (13)$$

To keep the average transmission power of the data REs unchanged, it is needed to scale down the transmission power of symbols bearing the reference signals. After being scaled down, the transmission power $P_1$ of symbols bearing the reference signals is as shown in an equation (14):

$$P_1 = P_{RS}^A - \max\{0, P_{data}^A - P_{MAX}\} \qquad (14)$$

It should be noted that, each parameter in the equations (13) and (14) is in unit of dBm, and it is also applicable to the case where $P_{MAX} < P_{data}^A$ and $P_{MAX} \geq P_{data}^A$.

Case 3

If $P_{RS}^A = P_{data}^A$, both the manners in case 1 and case 2 are applicable.

When the calculation of the transmission power $P_1$ of symbols bearing the reference signals and the transmission power $P_2$ of symbols bearing no reference signals in step 2610 is completed, the symbol is transmitted according to the calculated transmission power.

Embodiment 7

In the present embodiment, a manner of uplink power allocation will be discussed in connection with a specific system. The system configuration is the same as that in the sixth embodiment. When uplink power control is performed, the base station adjusts the transmission powers of the reference signal REs and the data REs using the ratio of the average transmission power of the reference signal REs to that of the data REs. In the present embodiment, two parameters are used to represent the ratio of the average transmission power of the reference signal REs to that of the data REs.

Particularly, two parameters of $\rho_A$ and $\rho_B$ are used to represent the ratio of the average transmission power of the reference signal REs to that of the data REs. Wherein, a ratio of the average transmission power of the reference signal REs to the average transmission power of the data REs on symbols bearing the reference signal is defined as $\rho_A$; and a ratio of the average transmission power of the reference signal REs to the average transmission power of the data REs on symbols bearing no reference signals is defined as $\rho_B$.

Similarly to the sixth embodiment, the procedure of the uplink signal power control may also be described in connection with FIG. 25. The difference from the sixth embodiment is in that, in the seventh embodiment, in step 2520, the terminal calculates the average transmission power of the data REs on symbols bearing the reference signals and bearing no reference signals as well as the average transmission power of the reference signal RE, in accordance with the power control parameter (TPC command), two parameters of $\rho_A$ and $\rho_B$ representing the ratio of average transmission power of the reference signal REs to that of the data REs, and the channel measurement result, as illustrated in FIGS. 27 and 28.

FIG. 27 is a flowchart illustrating the detailed procedure of step 2520 of FIG. 25 according to another embodiment of the present disclosure in detail.

Referring to FIG. 27, the calculation of the average transmission power of the data REs and the reference signal REs includes the steps of:

Step 2710: calculating the average transmission power of REs according to the received power control parameter (TPC command) and the channel measurement result;

Step 2720: determining the average transmission power of the data REs on symbols bearing the reference signals;

Step 2730: determining the average transmission power of the reference signal REs, according to the parameter $\rho_A$ and the average transmission power of the data REs on symbols bearing the reference signals;

Step 2740: determining the average transmission power of the data REs on symbols bearing no reference signals according to the parameter $\rho_B$;

Step 2750: determining the transmission power of symbols bearing the reference signals and the transmission power of symbols bearing no reference signals according to the reference signal structure.

Wherein, in step 2710, the average transmission power $P_{base}$ of REs is as follows:

$$P_{base} = P_0 + \alpha \cdot PL + \Delta_{TF} + f(\Delta_{TPC}) \qquad (15)$$

Wherein, parameter $P_0$ is a base power of REs configured by the base station; parameter PL is a pathloss measured by the terminal, parameter $\alpha$ is a compensation factor of the pathloss, which is configured and notified by the base station via the higher signalling; parameter $\Delta_{TF}$ is a power adjustment quantity calculated by the terminal according to the Modulation and Coding Scheme (MCS) adopted in the uplink data transmission; and parameter $f(\Delta_{TPC})$ is a dynamic power adjustment parameter calculated by the terminal according to the power control parameter (TPC command) configured by the base station, and its calculation approach may be determined by referring to the calculation approach of dynamic power adjustment parameter in LTE.

In the present embodiment, the unit of the power is always in dBm, and those skilled in the art can easily modify the equation (15) so that it can be applied to the situation where the parameters represent actual power values (in a unit of W, mW, or uW).

In step 2720, the average transmission power $P_{data}$ of the data REs on symbols bearing the reference signals is determined as shown in an equation (16):

$$P_{data} = P_{base} \quad (16)$$

In step 2730, the parameter $\rho_A$ of is in a unit of dB, and the average transmission power of the reference signal REs on symbols bearing the reference signals is:

$$P_{RS} = P_{data} + \rho_A \quad (17)$$

In step 2740, the parameter $\rho_B$ is in a unit of dB, and the average transmission power $P_{data}^B$ of the data REs on symbols bearing no reference signals is:

$$P_{data} = P_{RS} - \rho_B \quad (18)$$

In step 2750, the terminal acquires a total number $M_{all}$ of REs allocated to each symbol of the terminal, and a number $M_{data}$ of the data REs on the symbol bearing the reference signals and a number $M_{RS}$ of the reference signal REs, in accordance with the reference signal structure and the bandwidth allocated for uplink transmission. According to the above-described parameters, the terminal may calculate the transmission power $P_{RS}^A$ of symbols bearing the reference signals and the transmission power $P_{data}^A$ of symbols bearing no reference signals.

Specifically, on the one hand, the total transmission power of the reference signal REs on symbols bearing the reference signals is $P_{RS} + 10 \log_{10} M_{RS}$, with a unit of dBm. Further, the total transmission power of the data REs on symbols bearing the reference signals is $P_{data} + 10 \log_{10} M_{data}$, with a unit of. According to the aforementioned two parameters, the transmission power $P_{RS}^A$ of symbols bearing the reference signals may be calculated.

On the other hand, the total power $P_{data}^A$ of symbols bearing no reference signals may be calculated as:

$$P_{data}^A = P_{data}^B + 10 \log_{10} M_{all} \quad (19)$$

FIG. 28 is a flowchart illustrating the detailed procedure of step 2520 of FIG. 25 according to a further embodiment of the present disclosure in detail.

Step 2810: calculating the average transmission power of REs according to the received power control parameter (TPC command) and the channel measurement result;

Step 2820: determining the average transmission power of the reference signal REs, according to the calculated average transmission power of REs and a reference signal power adjustment value configured by the base station;

Step 2830: determining the average transmission power of the data REs on symbols bearing the reference signals, according to the parameter $\rho_A$ and an average transmission power of the reference signal REs;

Step 2840: determining the average transmission power of the data REs on symbols bearing no reference signals, according to the parameter ps and the average transmission power of the reference signal REs;

Step 2850: calculating the transmission power of symbols bearing the reference signals and the transmission power of symbols bearing no reference signals according the reference signal structure.

Wherein, in step 2810, the average transmission power $P_{base}$ of REs i is as follows:

$$P_{base} = P_0 + \alpha \cdot PL + \Delta_{TF} + f(\Delta_{TPC}) \quad (20)$$

Wherein, parameter $P_0$ is a base power of REs configured by the base station; parameter PL is a pathloss measured by the terminal, parameter $\alpha$ is a compensation factor of the pathloss, which is configured and notified by the base station via the higher signalling; parameter $\Delta_{TF}$ is a power adjustment quantity calculated by the terminal according to the Modulation and Coding Scheme (MCS) adopted in the uplink data transmission; and parameter $f(\Delta_{TPC})$ is a dynamic power adjustment parameter calculated by the terminal according to the power control parameter (TPC command) configured by the base station, and its calculation approach may be determined by referring to a calculation approach of dynamic power adjustment parameter in LTE.

In the present disclosure, the unit of power is dBm, and the corresponding result can be simply extended to the situation where the parameters represent the actual power values (in a unit of W, mW, or uW).

In step 2820, the average transmission power $P_{RS}$ of the reference signal REs is calculated as follows:

$$P_{RS} = P_{base} + \delta_{RS} \quad (21)$$

In an equation (21), the reference signal power adjustment value configured by the base station is denoted as $\delta_{RS}$. $\delta_{RS}$ may be 0 dB, that is, no adjustment is applied to the reference signal power.

In step 2830, the parameter $\rho_A$ is in a unit of dB, and the average transmission power $P_{data}$ of the data REs on symbols bearing the reference signals is:

$$P_{data} = P_{RS} - \rho_A \quad (22)$$

In step 2840, the parameter $\rho_B$ is in a unit of dB, and the average transmission power $P_{data}^B$ of the data REs on symbols bearing no reference signals is:

$$P_{data} = P_{RS} - \rho_B \quad (23)$$

The operation in step 2850 is as same as that in step 450, thus details will not be repeatedly herein.

In the seventh embodiment, another possible way for configuring and notifying the power control parameter and the power adjustment parameter is: both the power adjustment parameters and are configured and notified in the form of index table via the downlink control channel or the higher signalling.

A still further possible way for configuring and notifying the power control parameter and the power adjustment parameter is: the power adjustment parameters $\rho_A$ and $\rho_B$ are notified together with the power control parameter (TPC command) by one index table. Table 5 is an example of such index table.

TABLE 5

| Configuration index table of power control parameter and power adjustment parameter | | | |
|---|---|---|---|
| index | power control parameter(dB) | $\rho_A$(dB) | $\rho_B$(dB) |
| 0 | −3 | −1 | 0 |
| 1 | 0 | 0 | 1 |
| 2 | 3 | 1 | 2 |
| ... | ... | ... | ... |

In Table 5, a same power control parameter may correspond to a plurality of different power adjustment parameters. Meanwhile, the plurality of power control parameters corresponding to different power adjustment parameters may be same or different, or partially same.

Another further possible way for configuring and notifying the power control parameter and the power adjustment parameter is: with respect to the two parameters contained in the power adjustment parameter, the value of only one of them is notified, and at the same time the ratio between these two parameters is notified. For example, the value of the parameter $F_A=\rho_A$ is notified while the ratio of $F_B=\rho_B/\rho_A$ is notified. Meanwhile, the aforementioned parameters of $F_A$ and $F_B$ may be notified in the form of index table. Table 6 and Table 7 show possible examples for this way of notification and configuration respectively.

TABLE 6

Configuration index table of power adjustment parameter

| index | $F_A = \rho_A$ (dB) |
|---|---|
| 0 | −2 |
| 1 | −1 |
| 2 | 0 |
| 3 | 1 |
| ... | ... |

TABLE 7

Configuration index table of power adjustment parameter

| index | $F_B = \rho_B/\rho_A$ |
|---|---|
| 0 | 5/4 |
| 1 | 3/2 |
| 2 | 1 |
| 3 | 2/3 |
| ... | ... |

The parameters $F_A$ and $F_B$ are configured by way of the downlink control channel or the higher signalling. After receiving these two parameters, the terminal acquires through the parameter $F_A$, acquires $\rho_B$ according to $\rho_A$ and $F_B$, and in turn adjusts the average transmission power of the reference signal REs and the average transmission power of the data REs according to $\rho_A$ and $\rho_B$.

Additionally, the parameters and may also be configured together with the power control parameter using the same index table in the downlink control channel.

It should be noted that, in the above description, it may also define the parameter $F_A=\rho_B$, and define the parameter as a ratio of $\rho_A/\rho_B$, which does not affect the configuration manner.

In the seventh embodiment, two different kinds of symbols are distinguished from each other depending on whether they bear the reference signals, and the different power calculation procedures are specified for them. In actual practice, two different kinds of signals may be distinguished from each other by indexes of symbols bearing the reference signals and bearing no reference signals, which correspond to different reference signal structures. A possible description is shown in Table 8.

TABLE 8 indexes of symbols bearing reference signals and symbols bearing no reference signals

| Scene (reference signal mode/number of ports, etc.) | index of symbols bearing reference signals | index of symbols bearing no reference signals |
|---|---|---|
| 1 | index group 1a | index group 1b |
| 2 | index group 2a | index group 2b |
| ... | ... | ... |

It should be noted that, the index groups of symbols bearing the reference signals and the index groups of symbols bearing no reference signals in Table 8 constitute all possible symbol indexes, and they do not overlap with each other.

Embodiment 8

In the present embodiment, a manner of uplink power allocation will be discussed in connection with a specific system. In the present embodiment, the uplink signal transmission is performed using multiple different reference signal structures according to factors such as a number of antenna ports and service types. Reference signal density would be different for each reference signal structure. Wherein, the reference signal density refers to a density that the reference signal REs account for all the REs in the RB, that is, a ratio of a number of reference signal REs on the RB to a total number of REs on the RB. Meanwhile, in order to guarantee an orthogonality among reference signal sequences used by the different ports, some REs are used for neither data transmission nor reference signal transmission on specific ports. In this case, symbols bearing the reference signals and symbols bearing no reference signals may have different transmission power. For some low-cost terminals, a fluctuation and a variation of the transmission power may impose negative impact on the device cost. For these terminals, maintaining a stable transmission power may be advantageous to the device and performance.

In order to adapt to the reference signal structures having the different reference signal densities, the transmission power of symbols bearing the reference signals may be adjusted by adjusting the average transmission power of the reference signal REs (or the ratio of the average transmission power of the reference signal REs to that of the data REs). In the present embodiment, a signal interaction procedure between the base station and the terminal is shown in FIG. 29.

FIG. 29 is a diagram illustrating an information interaction procedure between the base station and the terminal according to one embodiment of the present disclosure.

Referring to FIG. 29, the procedure can be described briefly as below:

(a) the base station determines a proper reference signal structure and a corresponding reference signal density, on the basis of the signal to interference and noise ratio of a received signal of a previous data transmission, or a received strength of the reference signal, or a channel measurement result fed back by the terminal, or an uplink channel measurement result measured by the base station;

(b) the base station notifies the terminal of the reference signal structure determined by the base station and the corresponding reference signal density, through a downlink control channel or the higher signalling configuration;

(c) the terminal generates an uplink signal including the reference signal and data in accordance with the reference signal structure configured by the base station and the reference signal density and performs a transmission of the uplink signal on the time-frequency resources allocated by the base station;

(d) the base station detects and decodes the received uplink signal, according to the configured reference signal structure and the reference signal density.

The reference signal structures may correspond to the reference signal densities one-to-one. In this case, only a configuration indexes corresponding to the reference signal structures (or the reference signal densities) is required to be notified to the terminal by the base station, when the base station performs the configuration of the reference signal structures and the reference signal densities. The configuration information may be transmitted in a downlink control channel, and this transmission manner corresponds to a case where the reference signal density needs to be adjusted dynamically in realtime according to channel variation, with an application range including but not limited to a channel scene of high speed movement; the configuration information may also be transmitted by the higher signalling, and this transmission manner corresponds to a case where a semi-static configuration manner is possible due to a relatively slow variation of the reference signal density, and is applicable to a situation where the channel environment change experienced by the terminal is not quite radical.

In order to maintain the transmission power of symbols bearing the reference signals and the transmission power of symbols bearing no reference signals to be a same or similar power level, the different reference signal densities require corresponding ratios of the average transmission power of the reference signal REs to that of the data REs. More particular, the different reference signal densities correspond to the different ratios of average transmission power of the reference signal REs to that of the data REs (also referred to as the power adjustment parameter). The parameter is used for controlling the average transmission power of the reference signal REs, so that the transmission power of symbols bearing the reference signals changes. And said parameter may be configured in the following manners.

Manner 4.1

A parameter $\delta_{RS}$ is configured, and this parameter is used for adjusting a magnitude of a generated reference signal when the reference signal is generated. An example of magnitude adjustment is as follows: when the reference signal symbol $r_{RS}$ generated according to a preset rule is mapped to physical time-frequency resources, based on the parameter $\delta_{RS}$, the reference signal symbol $a_{RS}$ mapped to the physical time-frequency resources is determined as:

$$a_{RS}=\delta_{RS}r_{RS} \quad (24)$$

It should be noted that, the actual way for mapping the reference signal symbol $r_{RS}$ to the physical time-frequency resources may be much more complex, and the above example is just used for explaining how the parameter is utilized.

Manner 4.2

A parameter $\Delta_{RS}$ is configured, and this parameter represents an amount of adjustment of the average transmission power of the reference signal REs, and is in a unit of dB. The parameter is used for adjusting the average transmission power of the reference signal REs when the uplink power control is performed. More particular, the terminal calculates an average transmission power $P_{base}$ of REs (in a unit of dBm), according to the power control parameter (TPC command) configured by the base station and the channel measurement result. The detailed calculation manner is illustrated in the sixth and seventh embodiments. The average transmission power $P_{RS}$ of the reference signal REs is adjusted to be:

$$P_{RS}=P_{base}+\Delta_{RS}$$

After the average transmission power $P_{RS}$ of the reference signal REs is acquired, the terminal calculates the transmission power of symbols bearing the reference signals and the transmission power of symbols bearing no reference signals, in accordance with the bandwidth allocated by the base station and the reference signal density (or the reference signal structure). Finally, the transmission power of symbols scaled proportionally according to the limitation of the maximum transmission power of the terminal. These steps correspond to the step 2530 in FIG. 25, and details would not be repeated herein.

One notification manner of the aforementioned configuration manners 4.1 and 4.2 is that, the power adjustment parameter is notified implicitly through an indication of the reference signal structure/intensity, i.e., the mapping relationship between the reference signal structure/intensity and the aforementioned power adjustment parameter is set in advance. In this case, after the base station notifies the terminal of the reference signal structure/intensity, the base station may acquire the power adjustment parameter according to the mapping relationship set in advance, and use it to adjust the transmission power of reference signal.

Another notification manner of the aforementioned configuration manners 4.1 and 4.2 is that, the power adjustment parameter and the reference signal structure/intensity are notified independently. In this manner, the power adjustment parameter may be notified in the downlink control channel or configured through the higher signalling. The power adjustment parameter may also be notified in the downlink control channel along with the power control parameter (the aforementioned TPC command), that is, they may be notified with the same index table. Table 9 shows a possible example of a joint configuration of the power adjustment parameter and the power control parameter.

TABLE 9

Configuration index table of power adjustment parameter and power control parameter

| index | power control parameter(dB) | power adjustment parameter |
|---|---|---|
| 0 | −3 | parameter 1 |
| 1 | 0 | parameter 2 |
| 2 | 3 | parameter 3 |
| 3 | 6 | parameter 4 |
| ... | ... | ... |

It should be explained that, the example described above is just a possible form, and in practical applications, multiple power adjustment parameters may correspond to a same power control parameter, and multiple power adjustment parameters corresponding to different power control parameters may be same, may be different, or may be partially overlapped.

The aforementioned independent notification manner of the power adjustment parameter and the reference signal structure/intensity may also be applied to such an application scene that the base station only utilizes limited kinds of the reference signal structures/intensities, and at the same time, the base station may configure the average transmission power of the reference signal REs, and adjust the accuracy of the uplink channel estimation at the base station side in connection with the reference signal structure/intensity.

Embodiment 9

In the present embodiment, a way for uplink power control in a random access procedure will be discussed. In the random access procedure, the reference signal needs to be inserted for transmission of a message 3, in order for a channel estimation and a data demodulation of the message 3. Considering no terminal-specific downlink control channel existed in an initial access, a power control parameter of message 3 needs to be carried in a random access response.

A possible power control manner is to carry the power adjustment parameter in the random access response, for example, a new field for representing the power adjustment parameter (e.g., the ratio of average transmission power of the reference signal REs to that of the data REs) is added to the random access response, or the power adjustment parameter is notified directly. Specifically, a parameter $\Delta_{RS}$ data for adjusting the average transmission power of the reference signal REs may be added to the random access response; or the parameters $\rho_A$ and $\rho_B$ are added to the random access response, for adjusting the average transmission powers of the reference signal REs and the data REs on symbols bearing the reference signals as well as the average transmission powers of the data REs on symbols bearing no reference signals; or the power adjustment parameter may be added to the random access response, for adjusting the average transmission power of the reference signal REs.

In this way, a possible structure of the message 3 uplink grant is:

frequency hopping indication: 1 bit
resource allocation indication: 10 bits
modulation and coding manner indication: 4 bits
power control indication(TPC command): 3 bits
uplink time delay indication: 1 bit
CSI request indication: 1 bit
power adjustment indication: x bits.

In the structure above, x bits are added to the original uplink grant for the power adjustment indication of the reference signal. In addition, considering the diversity of application scenes in 5G, the original indication of uplink grant may change.

Another possible power control manner is that the power adjustment parameter for the power adjustment of the reference signal is added to the message 3 uplink grant (UL grant) included in the random access response. For example, additional bits are added to the message 3 uplink grant; or the number of bits of the original TPC command is increased, so that the TPC command is transmitted jointly together with the power adjustment parameter, as the power control indication. That is, the original TPC command and the power adjustment parameter are contained in the power control indication.

In the aforementioned second manner, a possible structure of the message 3 uplink grant is as follows:

frequency hopping indication: 1 bit
resource allocation indication: 10 bits
modulation and coding manner indication: 4 bits
power control (TPC command) indication: 3+x bits
uplink time delay indication: 1 bit
CSI request indication: 1 bit In the above structure, on the basis of the original uplink grant, x bits are added to the power control indication in order to indicate the power control parameter and the power adjustment parameter jointly with the original TPC command. A possible joint indication manner is shown in Table 10.

TABLE 10 a joint indication index of the power control parameter and the power adjustment parameter

| index | power control parameter (dB) | power adjustment parameter |
|-------|------------------------------|----------------------------|
| 0     | −6                           | parameter 1                |
| 1     | −4                           | parameter 2                |
| 2     | −2                           | parameter 3                |
| 3     | 0                            | parameter 4                |
| 4     | 2                            | parameter 5                |
| ...   | ...                          | ...                        |

It should be explained that, in the example above, a same power control parameter may correspond to different power adjustment parameters, and multiple power adjustment parameters corresponding to different power control parameters may be same, different, or partially same. In addition, considering the diversity of application scenes in 5G, the original indication of uplink grant may change.

After completing a preamble sequence transmission, the terminal detects the random access response in a corresponding random access response window according to a preset timing. If it is detected that a preamble sequence identifier matched with the sent preamble sequence is contained, contents of the random access response is further read. The terminal reads a timing advance information, the power control parameter (the aforementioned TPC command) and the aforementioned power adjustment parameter in the random access response. The terminal determines the average transmission power of the data REs and that of the reference signal REs sent by message 3 according to the power control parameter and the power adjustment parameter, and scales the transmission powers according to the maximum power limitation of the terminal, and transmits the message 3 according to the timing advance information in the end. The above procedure may be described with reference to FIG. 30.

FIG. 30 is a flowchart illustrating a power control procedure of message 3 in a random access procedure, according to one embodiment of the present disclosure.

Referring to FIG. 30, in the procedure illustrated in FIG. 30, the step of determining the average transmission power of the data REs and the reference signal REs of the message 3 according to the power control parameter and the power adjustment parameter may be performed with reference to the aforementioned embodiment.

Indicating the adjustment of the average transmission power of the reference signal REs and that of the data REs when message 3 is transmitted by adding bits for the power adjustment parameter into the random access response is applicable to contention-based and non-contention-based random access procedures.

Another simple message 3 power control manner is to preset a ratio of the average transmission power of reference signal REs to the average transmission power of data REs, without additional notification.

Embodiment 10

In the present embodiment, a manner of uplink reference signal power control will be discussed. In the sixth to ninth embodiments described above, the ratio of the average transmission power of the reference signal REs to the average transmission power of the data REs is changed or the average transmission power of the reference signal REs is directly adjusted. In the present embodiment, the average transmission power of the reference signal REs will be increased by keeping the symbol power unchanged while decreasing the average transmission power of the data REs, and its detailed procedure is shown in FIG. 31.

FIG. 31 is a flowchart illustrating an uplink power control method according to another embodiment of the present disclosure.

Referring to FIG. 31, the uplink power control method in the present embodiment comprises the steps of:

Step 3110: reading, by the terminal, the power control parameter and the power adjustment parameter;

Step 3120: determining, by the terminal, the average transmission power of REs according to the channel measurement result and the power control parameter;

Step 3130: adjusting, by the terminal, average transmission power of the data REs on symbols bearing the reference signals and that of the reference signal REs;

Step 3140: calculating, by the terminal, the transmission power of the symbols and adjusting the transmission power of the symbols according to the maximum power limit of the terminal.

Specifically, in this procedure, the goal of increasing channel estimation accuracy is achieved by decreasing average transmission power of data REs on symbols bearing the reference signals, increasing average transmission power of reference signal REs, while keeping the transmission power of symbol unchanged. An extreme case is that the data is not transmitted by the data REs on symbols bearing the reference signals, that is, the data REs on symbols bearing the reference signals are zeroed to guarantee accuracy of channel estimation.

In order to achieve the aforementioned goal, the power adjustment parameter for the data REs needs to be designed to adjust the average transmission power of the reference signal REs and the data REs. A possible way is that, the power adjustment parameter of the data REs $\Delta_{data}$ is set, which is in a unit of dB, and the power adjustment parameter $\Delta_{data}$ is notified in the downlink control channel in the form of index table, or the power adjustment parameter $\Delta_{data}$ is notified by way of the higher signalling configuration.

In step 3120, the terminal determines the average transmission power $P_{base}$ of REs according to the channel measurement result and the power control parameter. Wherein, the average transmission power $P_{base}$ of REs is an initial power without being power-adjusted, and it is calculated as follows:

$$P_{base}=P_0+\alpha \cdot PL+\Delta_{TF}+f(\Delta_{TPC}) \quad (25)$$

Wherein, parameter $P_0$ is a base power of REs configured by the base station; parameter PL is a pathloss measured by the terminal, parameter $\alpha$ is a compensation factor of the pathloss, which is configured and notified by the base station by the higher signalling; parameter $\Delta_{TF}$ is a power adjustment quantity calculated by the terminal according to the Modulation and Coding Scheme (MCS) adopted in uplink data transmission; and parameter $f(\Delta_{TPC})$ is a dynamic power adjustment parameter calculated by the terminal according to the power control parameter (TPC command) configured by the base station, and its calculation approach may be determined by referring to the calculation approach of dynamic power adjustment parameter in LTE.

It should be noted that, all powers in equation (25) denote to the average power per RE instead of the average power per symbol. In addition, the powers may be represented in a unit of dBm.

In step 3130, the average transmission power $P_{data}$ of the data REs on symbols bearing the reference signals and the average transmission power $P_{RS}$ of the reference signal REs are determined, in accordance with the average transmission power $P_{base}$ of REs obtained in step 3120 and the power adjustment parameter $\Delta_{data}$ of data REs configured by the base station. The details are as follows:

$$P_{data}=P_{base}+\Delta_{data} \quad (26)$$

$$P_{RS}=P_{base}-\Delta_{data} \quad (27)$$

In step 3140, the terminal calculates the transmission power per symbol according to the calculated average transmission power of the data REs and the reference signal REs, and calculates the final transmission power per symbol according to the maximum power limit of the terminal. Specifically, in accordance with the uplink bandwidth allocated by the base station and the reference signal structure, the number of data REs on symbols bearing no reference signals, and the number of the data REs and the number of the reference signal REs on symbols bearing no reference signals are acquired, and then the transmission power per symbol is calculated; in accordance with the obtained transmission power per symbol and the maximum power limit of the terminal, the transmission power per symbol is adjusted.

Despite the aforementioned way of power adjustment, another way to increase reference signal transmission power is that a part or all of data REs are zeroed on symbol bearing reference signals, that is, the data REs are not used for data transmission.

FIG. 32 is a block diagram of a structure of a terminal 3200 according to an embodiment of the present disclosure.

As illustrated in FIG. 32, the terminal 3200 includes a transceiver 3210, a controller 3220, and a memory 3230.

The transceiver 3210 may transmit and receive uplink and/or downlink wireless signal in a wireless communication network, so that it can communicate with the base station or other terminals. The controller 3220 may generate signals to be transmitted by the transceiver 3210, interpret signals received by the transceiver 3210, or control operations of the transceiver 3210. The controller 3220 may perform the uplink power control methods in the sixth to tenth embodiments of the present disclosure to control the uplink transmission power. The memory 3230 may store the program codes, instructions, parameters etc. required by operations of controller 3220.

The apparatuses and methods according to the present disclosure may be implemented in hardware, firmware, software, program code, or any of the combinations thereof. Additionally, the software or program code may be stored in a non-transitory storage medium such as CD ROM, RAM, erasable or rewritable ROM, floppy disk, CD, DVD, memory chip, hard disk drive, magnetic storage medium, optical storage Media, magneto-optical disk, or program code that is initially stored in remote storage medium, computer-readable medium, or non-transitory machine readable medium that is downloaded over the network and stored in local storage medium, so that the methods described herein may be implemented in the software, program code, software module, object, instructions, applications, Applet, application programs in the storage medium of general purpose computer, digital computer, or dedicated processor, or programmable or dedicated hardware, such as ASCI or FPGA. As understood by those skilled in the art, the computer, processor, microprocessor controller, or programmable hardware includes volatile and/or non-volatile memory and storage elements, such as RAM, ROM, or flash memory, which may store or receive the software or program code implementing the method herein when accessed by computers, processors, or other hardware. Additionally, it should be understood that a general purpose computer will be transformed into a dedicated computer for performing the methods illustrated herein if it accesses program code for implementing the methods. Furthermore, the program may be transmitted electronically by any medium such as a communicating signal transmitted over a wired/wireless connection or their equivalents. The programs and computer readable storage medium may be distributed over computer systems coupled by network so that the computer readable code is stored and executed in a distributed fashion.

Various embodiments of the present disclosure may be implemented as a computer-readable codes embodied on a computer-readable recording medium from a particular perspective. The computer-readable recording medium is any data storage device that may store data readable to computer systems. Examples of the computer-readable recording medium may include read only memories (ROMs), random access memories (RAM), compact disk-read only memories (CD-ROMs), magnetic tapes, floppy disks, optical data storage devices, carrier waves (e.g., data transmission via the Internet), and the like. The computer-readable recording medium may be distributed by computer systems connected over a network, and thus the computer-readable codes may be stored and executed in distributed ways. Furthermore, functional programs, codes, and code segments for achieving various embodiments of the present disclosure may be readily interpreted by skilled programmers in the art to which embodiments of the present disclosure are applied.

It will be appreciated that the embodiments of the present disclosure may be implemented in a form of hardware, software, or a combination of hardware and software. The software may be stored as program instructions or computer readable codes executable on the processor on a non-transitory computer-readable medium. Examples of the non-transitory computer readable recording medium include magnetic storage media (e.g., a ROM, floppy disks, hard disks, and the like), and optical recording media (e.g., CD-ROMs, Digital Video Disks (DVDs), and the like). The non-transitory computer readable recording medium can also be distributed over network coupled computer systems so that the computer readable code is stored and executed in a distributed fashion. This media can be read by the computer, stored in the memory, and executed by the processor. The various embodiments may be implemented by a computer or portable terminal including a controller and a memory, and the memory may be an example of the non-transitory computer readable recording medium suitable for storing a program or programs having instructions that implement the embodiments of the present disclosure. The present disclosure may be implemented by a program having codes for embodying the apparatus and method described in claims, the program being stored in a machine (or computer) readable storage medium. The program may be electronically carried on any medium, such as communication signals transferred via wired or wireless connection, and the present disclosure suitably includes its equivalent.

The methods according to embodiments described in the claims or the specification of the present invention can be implemented in hardware, software, or a combination of hardware and software.

As for the software implementation, a computer-readable storage medium storing one or more programs (software modules) can be provided. One or more programs stored in the computer-readable storage medium can be configured for execution by one or more processors of an electronic device. One or more programs can include instructions for enabling the electronic device to execute the methods according to the embodiments described in the claims or the specification of the present invention.

Such a program (software module, software) can be stored to a random access memory, a non-volatile memory including a flash memory, a Read Only Memory (ROM), an Electrically Erasable Programmable Read Only Memory (EEPROM), a magnetic disc storage device, a compact Disc (CD)-ROM, Digital Versatile Discs (DVDs) or other optical storage devices, and a magnetic cassette. Alternatively, the program can be stored to a memory combining part or all of those recording media. Also, a plurality of memories may be included.

Also, the program can be stored in an attachable storage device accessible via a communication network such as Internet, Intranet, Local Area Network (LAN), Wide LAN (WLAN), or Storage Area Network (SAN), or a communication network by combining these networks. Such a storage device can access the device which carries out an embodiment of the present invention through an external port. Also, a separate storage device on the communication network may access the device of the present invention.

In the specific embodiments of the present invention, the elements included in the invention are expressed in a singular or plural form. However, the singular or plural expression is appropriately selected according to a proposed situation for the convenience of explanation, and the present invention is not limited to a single element or a plurality of elements. The elements expressed in the plural form may be configured as a single element and the elements expressed in the singular form may be configured as a plurality of elements.

While the specific embodiment has been described in the specification of the present invention, it will be understood that various changes can be made therein without departing from the scope of the present. Therefore, the scope of the invention is not limited to the described embodiments but is defined by the scope of the claims to be explained and their equivalents.

According to another aspect of the present disclosure, a method for configuring a power adjustment parameter and a power control parameter utilized in an uplink power control method of a terminal in a wireless communication network is provided, the method includes independently configuring the power adjustment parameter and the power control parameter in different index tables respectively, or jointly configuring the power adjustment parameter and the power control parameter in a same index table.

According to another aspect of the present disclosure, the method further includes independently configuring each of different power adjustment parameters together with the power control parameter in different index tables respectively.

According to another aspect of the present disclosure, the method further includes jointly configuring different power adjustment parameters with the power control parameter together in a same index table.

According to another aspect of the present disclosure, an apparatus for configuring a power adjustment parameter and a power control parameter utilized in an uplink power control method of a terminal in a wireless communication network is provided, the apparatus is configured to independently configure the power adjustment parameter and the power control parameter in different index tables respectively, or jointly configure the power adjustment parameter and the power control parameter in a same index table.

According to another aspect of the present disclosure, the apparatus is further configured to independently configure each of different power adjustment parameters together with the power control parameter in different index tables respectively.

According to another aspect of the present disclosure, the apparatus is further configured to configure different power adjustment parameters with the power control parameter together in a same index table respectively.

The foregoing descriptions are only the preferred embodiments of the present disclosure, and not used to limit the present disclosure. Any changes, equivalents, modifications, and the like therein within the spirit and principle of the present disclosure should be encompassed in the scope of the present disclosure.

For understanding of the exemplary embodiments, the random access method and apparatus thereof, and the method for assigning random access resource and apparatus thereof are described and illustrated in drawings. However, it should be understood that above implementations are only illustrative implementations utilized for explaining the principle of the present disclosure; however, the present disclosure is not limited thereto. For those ordinary skilled in the art, many variations or improvements may be made without departing from the spirit and essence of the present disclosure, and such variations and improvements fall into the protection scope of the present disclosure.

The invention claimed is:

1. A method for operating a terminal in a wireless communication system, the method comprises:
   determining at least one of an average transmission power of data resource elements (REs) and an average transmission power of reference signal REs, based on an average transmission power of REs on an uplink and pre-determined power adjustment parameter;
   determining a first transmission power of symbol based on at least one of the determined average transmission power of the data REs and the average transmission power of the reference signal REs; and
   adjusting the first transmission power of symbol to a second transmission power for transmitting the symbol based on a maximum terminal transmission power and the first transmission power.

2. The method of claim 1, wherein the power adjustment parameter comprises a ratio of the average transmission power of the reference signal REs to the average transmission power of the data REs.

3. The method of claim 2, wherein the ratio of the average transmission power of the reference signal REs to the average transmission power of the data REs comprises a first ratio, wherein the first ratio is a ratio of the average transmission power of the reference signal REs to an average transmission power of the data REs on a resource block (RB).

4. The method of claim 2, wherein the ratio of the average transmission power of the reference signal REs to the average transmission power of the data Res comprises a second ratio and a third ratio, wherein the second ratio is a ratio of the average transmission power of the reference signal REs to an average transmission power of the data REs in symbols containing the reference signal REs, and the third ratio is a ratio of the average transmission power of the reference signal REs to an average transmission power of the data REs in symbols not containing the reference signal REs.

5. The method of claim 3, further comprising:
   determining the average transmission power of the data REs on the RB as an average transmission power of the REs, and determining the average transmission power of the reference signal REs as a sum of the average transmission power of the data REs and the first ratio; and
   acquiring the first transmission power of symbol, on the basis of the average transmission power of the data REs on the RB and the average transmission power of the reference signal REs,
   wherein each of the average transmission power of the REs, the average transmission power of the data REs on the RB, and the average transmission power of the reference signal REs is in a unit of dBm, and the first ratio is in a unit of dB.

6. The method of claim 4, further comprising:
   determining the average transmission power of the data REs in symbols containing the reference signal REs as the average transmission power of the REs;
   determining the average transmission power of the reference signal REs as a sum of the average transmission power of the data REs in symbols containing the reference signal REs and the second ratio;
   determining the average transmission power of the data REs in symbols not containing the reference signal REs as a difference value obtained by subtracting the third ratio from the average transmission power of the reference signal REs; and
   acquiring the first transmission power of symbol, on the basis of the average transmission power of the reference signal REs, the average transmission power of the data REs in symbols containing the reference signal REs, and the average transmission power of the data REs in symbols not containing the reference signal REs, and
   wherein each of the average transmission power of the REs, the average transmission power of the data REs in symbols containing the reference signal REs, and the average transmission power of the data REs in symbols not containing the reference signal REs is in a unit of dBm, and each of the second ratio and the third ratio is a unit of in dB.

7. The method of claim 4, further comprising:
   determining the average transmission power of the reference signal REs based on the average transmission power of the REs;
   determining the average transmission power of the data REs in symbols containing the reference signal REs as a difference value obtained by subtracting the second ratio from the average transmission power of the reference signal REs;
   determining the average transmission power of the data REs in symbols not containing the reference signal REs as a difference value by subtracting of the third ratio from the average transmission power of by subtracting reference signal REs; and
   acquiring the first transmission power of symbol, on the basis of the average transmission power of the reference signal REs, the average transmission power of the data REs in symbols containing the reference signal REs, and the average transmission power of the data REs in symbols not containing the reference signal REs, and wherein each of the average transmission power of REs, the average transmission power of the reference signal REs, the average transmission power of the data REs in symbols containing the reference signal REs, and the average transmission power of the data REs in symbols not containing the reference signal REs is in a unit of dBm, and each of the second ratio and the third ratio is in a unit of dB.

* * * * *